(12) United States Patent  
Kohtani

(10) Patent No.: US 11,525,888 B2  
(45) Date of Patent: Dec. 13, 2022

(54) SELF-DIAGNOSIS DEVICE

(71) Applicant: DENSO CORPORATION, Kariya (JP)

(72) Inventor: Masato Kohtani, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 17/136,258

(22) Filed: Dec. 29, 2020

(65) Prior Publication Data

US 2021/0208246 A1 Jul. 8, 2021

(30) Foreign Application Priority Data

Jan. 8, 2020 (JP) .............................. JP2020-001390

(51) Int. Cl.
   *G01S 7/40* (2006.01)
   *H04L 27/36* (2006.01)
   *H01Q 3/26* (2006.01)
   *G01S 13/02* (2006.01)

(52) U.S. Cl.
   CPC .......... *G01S 7/4008* (2013.01); *G01S 7/4021* (2013.01); *H01Q 3/267* (2013.01); *H04L 27/364* (2013.01); *G01S 2013/0245* (2013.01)

(58) Field of Classification Search
   CPC .......... G01S 2013/0245; G01S 7/4008; G01S 7/4021; H01Q 1/3233; H01Q 3/267; H04L 27/364
   See application file for complete search history.

(56) References Cited

U.S. PATENT DOCUMENTS

| | | | |
|---|---|---|---|
| 2010/0093282 A1* | 4/2010 | Martikkala | H04B 17/21 455/63.4 |
| 2015/0256272 A1* | 9/2015 | Weissman | H03F 3/213 455/84 |
| 2015/0276919 A1* | 10/2015 | Matsumura | H01Q 1/3233 342/368 |
| 2017/0257137 A1 | 9/2017 | Matsumura | |
| 2019/0140349 A1* | 5/2019 | Fikes | H01Q 3/267 |
| 2019/0372218 A1* | 12/2019 | Vehovc | H01Q 3/267 |

OTHER PUBLICATIONS

"AWR1243 Single-Chip 77- and 79-GHz FMCW Transceiver" Texas Instruments Incorporated <http://www.ti.com/lit/ds/symlink/awr1243.pdf> (revised Apr. 2020).

* cited by examiner

Primary Examiner — Timothy X Pham
(74) Attorney, Agent, or Firm — Posz Law Group, PLC

(57) ABSTRACT

A self-diagnosis device of a radar system or a phased-array antenna module including a general-purpose multi-channel IC and a transmission phase shifter IC having a plurality of transmission output terminals and reception terminals is configured to perform a self-diagnosis of the transmission phase shifter by utilizing a signal that is generatable by the general-purpose multi-channel IC, which is enabled by a built-in self-test circuit that (A) generates a self-diagnosis monitor signal converted into a low frequency band, which is a mixture of (i) a self-diagnosis signal generated from (a) a third output signal and a fourth output signal output in sync from same PLL with (b) a first output signal to be supplied to a reception frequency converter of the general-purpose multi-channel IC, and (ii) a composite signal of the transmission channel, and (B) analyzes a phase of the self-diagnosis monitor signal.

17 Claims, 17 Drawing Sheets

SELF-DIAGNOSIS DEVICE

CROSS REFERENCE TO RELATED APPLICATION

The present application is based on and claims the benefit of priority of Japanese Patent Application No. 2020-001390, filed on Jan. 8, 2020, the disclosure of which is incorporated herein by reference.

TECHNICAL FIELD

The present application relates to a self-diagnosis device.

BACKGROUND INFORMATION

In recent years, many technologies such as collision prevention and automatic drive operation have been proposed, among which a measurement technology using radar technology such as the distance measurement from the own device to the target, the relative speed measurement with the target, and the existence angle measurement of the target (arrival/incident angle of a radar received waves) are attracting attention. The applicant has proposed a millimeter-wave band radar system for a moving body as a device for measuring the distance from the own device to the target, the relative velocity to the target, and the existence angle of the target. The semiconductor integrated circuits that make up the millimeter-wave band radar system have, as a built-in function, a BIST (Built-In Self-Test) function that tests internally in order to realize self-diagnosis and reduce the cost required for testing at the time of shipment. This BIST function may be performed by a BIST circuit.

When the general-purpose multi-channel IC is used for other methods such as monopulse method instead of MIMO, the applicant found that the signal that can be generated by the general-purpose multi-channel IC is usable as a part of the on-chip BIST signal source.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
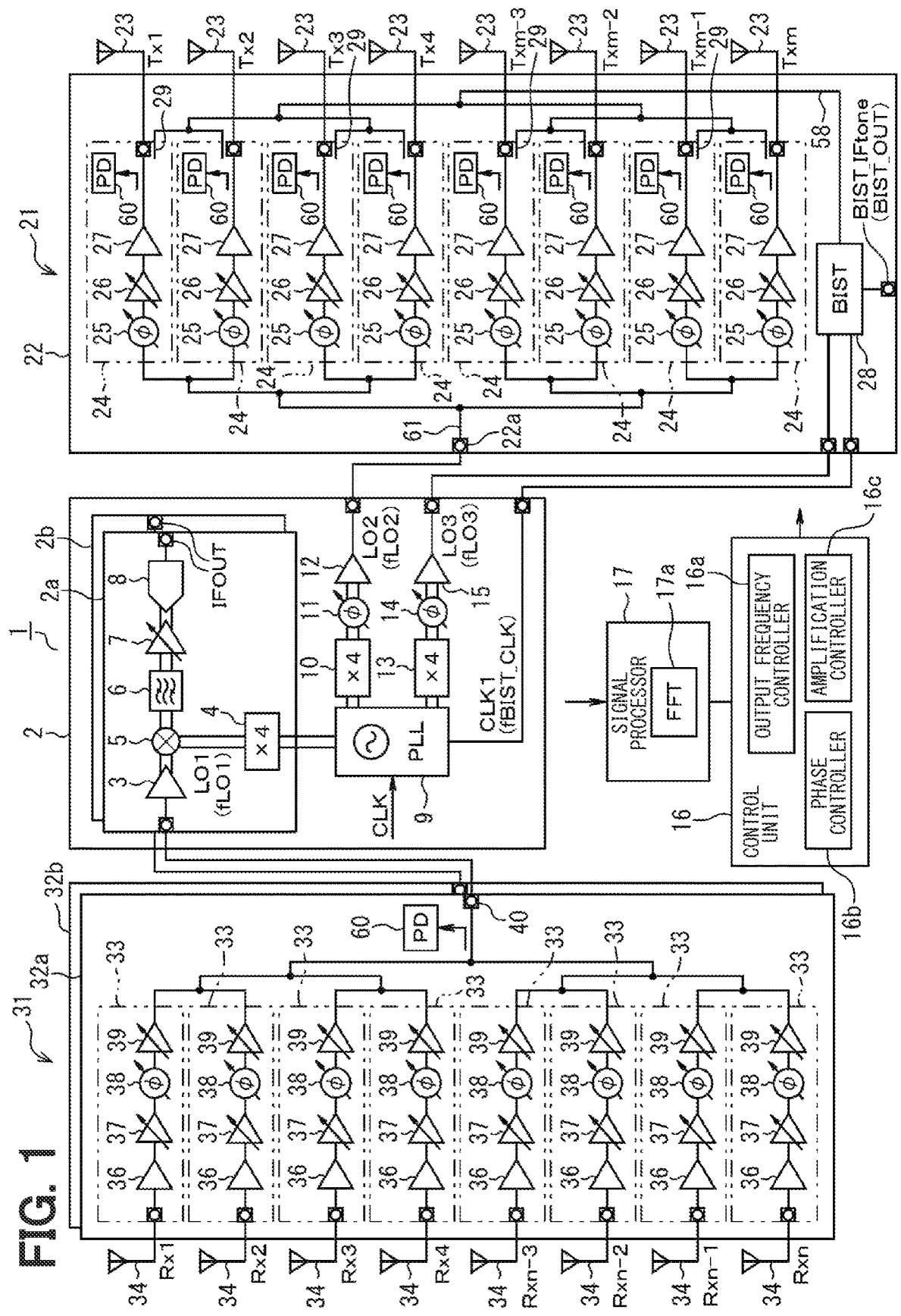
FIG. 1 is an electrical configuration diagram of a radar system according to a first embodiment.

Some embodiments are described with reference to the drawings. In each of the embodiments described below, the same or similar reference numerals are used to designate the same or similar configurations, and a description thereof is omitted as necessary.

First Embodiment

FIG. 1 to FIG. 4 show explanatory views of the first embodiment. A phased array antenna module 1 for millimeter wave radar constituting a radar system illustrated in FIG. 1 is configured by connecting a general-purpose multi-channel IC 2, a transmission phased array unit 21, and a reception phased array unit 31, and a control unit 16 controls entire module 1 for its operation. Hereinafter, the phased array antenna module 1 for millimeter wave radar is abbreviated as a module 1. The radar system using the module 1 is configured for processing the signals output from the general-purpose multi-channel IC 2 and the reception phased array unit 31 by a signal processor 17.

The transmission phased array unit 21 includes a transmission phase shifter IC 22 and a respective transmission antenna 23 connected respectively to each of transmission ends of transmission channels Tx1 to Txm of the transmission phase shifter IC 22. The reception phased array unit 31 includes two reception phase shifter ICs 32a and 32b, and a reception antenna 34 connected to each of reception ends of reception channels Rx1 to Rxn of the reception phase shifter ICs 32a and 32b.

The control unit 16 performs various control functions such as an output frequency controller 16a, a phase controller 16b, and an amplification controller 16c by executing a predetermined control logic. The output frequency controller 16a controls the output frequency of a PLL 9. The phase controller 16b controls the phase of (variable) phase shifters 11 and 14 of the general-purpose multi-channel IC 2, the phase of a (variable) phase shifter 25 of the transmission phased array unit 21, and the phase of a (variable) phase shifter 38 of the reception phased array unit 31. The amplification controller 16c controls the amplification degree of a variable gain amplifier 26 of the transmission phased array unit 21 and variable gain amplifiers 37 and 39 of the reception phased array unit 31.

The general-purpose multi-channel IC 2 (also known as the multi-channel circuit 2) operates by inputting composite signals of reception channels Rx1 to Rxn from two reception phase shifter ICs 32a and 32b of the reception phased array unit 31, and includes multi-channel receivers 2a and 2b (a first multi-channel receiver 2a and a second multi-channel receiver 2b), the PLL (Phase-Locked Loop) 9, a multiplier 10, a phase shifter 11, a power amplifier 12, a multiplier 13, a phase shifter 14, and a power amplifier 15. The multi-channel receivers 2a and 2b are configured to include an LNA (Low Noise Amplifier) 3, a multiplier 4, a mixer 5, an IF filter 6, and an intermediate frequency variable gain amplifier (IFVGA) 7, respectively. The detailed configuration of the multi-channel receivers 2a and 2b is described later. In one embodiment, IFVGA 7 is the only intermediate frequency (IF) component in the general-purpose multi-channel IC 2.

The general-purpose multi-channel IC 2 is, for example, an FMCW/FCM (Frequency Modulated Continuous Wave/Fast Chirp Modulation) transceiver IC used in the millimeter wave band (76 GHz-81 GHz) having a plurality of channels of transmission output and a plurality of channels of reception input. The general-purpose multi-channel IC 2 of the present embodiment is described with reference to a configuration example of transmission 2ch and reception 2ch. However, for example, a configuration of transmission 3ch and reception 4ch may also be used, and the number of transmission output channels and the number of reception input channels may be arbitrarily set.

The PLL 9 uses a reference clock CLK input from a reference oscillation circuit (not shown), and adjusts parameters such as a multiplication factor of the reference clock CLK to obtain, for example, for synchronous generation of a first signal to a third signal of the frequency in the GHz band, along with synchronous generation of a fourth signal in the MHz band. The PLL 9 outputs a first raw signal to the multi-channel receivers 2a and 2b. The multi-channel receivers 2a and 2b have a built-in multiplier 4, and multiply the raw signal by four to obtain a first output signal LO1 having a first frequency fLO1.

On the other hand (outside of the multi-channel receivers 2a and 2b), the multiplier 10 outputs, to the phase shifter 11, a signal obtained by multiplying a second raw signal of the PLL 9 by four. The phase shifter 11 is configured so that the phase value can be controlled by the phase controller 16b of the control unit 16, and outputs, to the power amplifier 12, a signal whose phase is shifted by a set phase value. The power amplifier 12 amplifies the phase shifted signal and outputs it as a second output signal LO2 having a second frequency fLO2 to the transmission phased array unit 21 for signal output of transmission channels Tx1 to Txm.

Further, the multiplier 13 multiplies a third raw signal of the PLL 9 by four, and outputs the multiplied signal to the phase shifter 14. The phase shifter 14 is configured so that the phase value can be controlled by the phase controller 16b of the control unit 16, and outputs a signal whose phase has been shifted by the set phase value to the power amplifier 15. The power amplifier 15 amplifies the phase shifted signal and outputs it as a third output signal LO3 having a frequency fLO3 to the transmission phase shifter IC 22 of the transmission phased array unit 21. The set phase value shift of the second output signal may be different than the set phase value shift of the third output signal. Further, the PLL 9 outputs a fourth output signal CLK1 as a self-diagnosis clock signal CLK1 to the transmission phase shifter IC 22 of the transmission phased array unit 21.

In one embodiment, the phase shifters 11 and 14 may both be set to a zero degrees phase shift (or both set to identical phase shifts), such that the second output signal LO2 and the third output signal LO3 have an identical phases.

As a result, the general-purpose multi-channel IC 2 can synchronously generate the first output signal LO1 of the frequency fLO1, the second output signal LO2 of the frequency fLO2, and the third output signal LO3 of the frequency fLO3. Further, the general-purpose multi-channel IC 2 can generate the self-diagnosis clock signal CLK1 having a frequency fBIST_CLK in synchronization with the above-mentioned first to third output signals LO1 to LO3.

Since the PLL 9 in the same block generates all of the first to fourth signals, the first output signal LO1 to the third output signal LO3 and the self-diagnosis clock signal CLK1 respectively have a high correlation in terms of (i) a frequency change of the reference clock CLK and (ii) frequency characteristic changes caused by the change of the external environment (such as temperature). As a result, a high-quality signal with good C/N (or CNR Carrier to Noise ratio, or SNR Signal to Noise Ratio) and frequency accuracy can be generated.

The frequencies fLO1 to fLO3 of the first output signal LO1 to the third output signal LO3 are the same as each other, i.e., 80 GHz, for example. The self-diagnosis clock signal CLK1 is a clock signal having a frequency fBIST_CLK (for example, about 20 MHz) that satisfies a frequency condition lower than the frequency of the first output signal LO1 to the third output signal LO3 and exceeding DC ("Direct Current"). In this context, DC is a substantially zero frequency current, for example.

When the radar system normally measures a distance to a target using the module 1, the control unit 16 stops the output of the self-diagnosis clock signal CLK1 by the PLL 9 to measure the distance.

On the other hand, the transmission phase shifter IC 22 includes two or more transmission channels Tx1 to Txm as transmission channels 24, and inputs of the transmission channels 24 are commonly connected to an input terminal 22a. The second output signal LO2 of the general-purpose multi-channel IC 2 is input to the input terminal 22a.

A transmission line 61 is provided between the input terminal 22a and the phase shifter 25 of the transmission channel 24 of each of the transmission channels Tx1 to Txm. The transmission line 61 is composed of equal length paths according to a tournament mode. The tournament mode mentioned here is, for example, a mode in which a plurality of linear transmission lines are provided respectively as an equal length path between the input terminal 22a and the input of the phase shifter 25 of each of the transmission channels 24 while being connected at a connection point, curved, and/or bent.

The transmission line 61 transmits signals from the input terminal 22a to the phase shifter 25 of each of the transmission channels Tx1 to Txm along a path having the same length as each other, and transmits each signal from the input terminal 22a to the input of each channel 24 with the phase of the transmitted signal matched to each other as much as possible. The structure of the transmission line 61 illustrated in FIG. 1 is just an example, and, as long as satisfying the condition that the path from the input terminal 22a to the input of the phase shifter 25 of each of the transmission channels Tx1 to Txm is an equal length path on the transmission line 61, the structure is not particularly limited to the above-described structure.

Each transmission channel 24 is configured by series connecting a phase shifter 25, a variable gain amplifier 26, and a power amplifier 27. That is, the transmission channel 24 includes the phase shifter 25 in the transmission path. A respective transmission antenna 23 is connected to a transmission end (a downstream end) of each transmission channel 24 of the transmission phase shifter IC 22.

The phase shifter 25 of each of the transmission channels Tx1 to Txm adjusts the phase of the second output signal LO2 of the general-purpose multi-channel IC 2 based on the control signal input from the phase controller 16b of the control unit 16, for correlation among the transmission channels Tx1 to Txm.

The phase controller 16b of the control unit 16 outputs a phase control signal to the phase shifters 25 of each of the transmission channels Tx1 to Txm in step of several degrees. Then, the phase shifter 25 of each of the transmission channels Tx1 to Txm outputs a signal shifted by the phase multiplied by a proportional number based on the identification numbers 1 to m of each of the transmission channels Tx1 to Txm.

When the beam steering is directed in a θ direction, a phase step φn of the phase shifter 25 is calculated by the following equation (1). Here, λ=76.5 GHz wavelength and d=antenna spacing. For example, when the control unit 16 steers by using the phase controller 16b in a direction indicating 1°, each of the phase shifters 25 shifts phase based on the equation (1) and the identification numbers 1 to n of the transmission channels Tx1 to Txn, and the signal is output, such as 0° for channel 1, 3° for channel 2, and 6° for channel 3.

[Equation 1]

$$\varphi_n = (n-1) \times \frac{360° \times d \times \sin\theta}{\lambda} \quad (1)$$

The output of the phase shifter 25 is input to the variable gain amplifier 26. The variable gain amplifier 26 is configured to set an amplification amount adjusted based on the control signal input from the amplification controller 16c of the control unit 16, and amplifies the output of the phase shifter 25 to output the (variably) amplified signal to the (fixed, or uncontrolled) power amplifier 27. The power amplifier 27 amplifies the output of the variable gain amplifier 26, and outputs the amplified signal to the transmission antenna 23 to irradiate a target (target: not shown) with radar waves in the millimeter wave band (for example, 80 GHz band). A power detector 60 is incorporated in the transmission phase shifter IC 22 of the present embodiment. The power detector 60 has a function of detecting the transmission power of the power amplifiers 27 of each of the transmission channels Tx1 to Txm, and the output power can be preliminarily detected by the power detector 60.

On the other hand, the reception phased array unit 31 includes two reception phase shifter ICs 32a and 32b. Here, the configuration using the two reception phase shifter ICs 32a and 32b is described, but the number of the reception phase shifter ICs 32a and 32b is not limited to two. Since the reception phase shifter ICs 32a and 32b each have the same configuration, the configuration of the reception phase shifter IC 32a is described, and the configuration description of the reception phase shifter IC 32b is omitted.

The (first) reception phase shifter IC 32a is configured by incorporating reception channels 33 as a plurality of reception channels Rx1 to Rxn. A respective reception antenna 34 is connected to a reception end of the reception channel 33 of each of the reception channels Rx1 to Rxn.

The reception phase shifter IC 32a receives the radar wave reflected by the target by the reception antenna 34, processes it via a low noise amplifier 36, a variable gain amplifier 37, the phase shifter 38, and a variable gain amplifier 39, and, after processing, synthesizes signals from each of the signals in the millimeter-wave band of the reception channel, and outputs the composite signal from an output terminal 40.

The low noise amplifier 36 performs a low noise amplification of the signal received from the reception antenna 34 after reflection by the target, and outputs the signal to the variable gain amplifier 37. The variable gain amplifier 37 is configured so that the amplification amount can be changed based on the control signal input from the amplification controller 16c of the control unit 16, amplifies the signal input from the low noise amplifier 36, and outputs the signal to the phase shifter 38.

The phase shifter 38 of each of the reception channels Rx1 to Rxn adjusts the phase of the output of the variable gain amplifier 37 among the reception channels Rx1 to Rxn based on the control signal input from the phase controller 16b of the control unit 16, for correlation among the reception channels Rx1 to Rxn. For example, the control unit 16 outputs a phase control signal to the phase shifter 38 of each of the reception channels Rx1 to Rxn in step of several degrees by the phase controller 16b, so that the phase shifter 38 of each of the reception channels Rx1 to Rxn can generate signals, and output the signals by shifting the phase by an amount corresponding to the identification numbers 1 to n of each of the reception channels Rx1 to Rxn based on the equation (1).

For example, when the phase controller 16b of the control unit 16 outputs a phase control signal indicating 1°, the phase shifters 38 output, to the variable gain amplifier 39, signals with the phase shifted by the amount calculated based on the equation (1), the shifts of the phase corresponding to the identification numbers 1 to n of the reception channels Rx1 to Rxn, such as 0° for channel 1, 3° for channel 2, and 6° for channel 3, and the like.

The variable gain amplifier 39 is configured so that the amplification degree can be changed based on the control signal input from the amplification controller 16c of the control unit 16, and amplifies the output of the phase shifter 38. The reception phase shifter IC 32a synthesizes the output signals of the variable gain amplifiers 39 of the reception channels Rx1 to Rxn and outputs a millimeter wave band signal from the output terminal 40. The reception phase shifter ICs 32a and 32b cause the output signals from the output terminals 40 to be input to the multi-channel receivers 2a and 2b of the general-purpose multi-channel IC 2.

Each of the multi-channel receivers 2a and 2b inputs the (synthesized) processed signals of a plurality of reception channels Rx1 to Rxn from the reception phased array unit 31, mixes input signals from those channels with the first output signal LO1, and obtains/makes a respective intermediate frequency signal IFOUT (a first IFOUT for the first multi-channel receiver 2a, a second IFOUT for the second multi-channel receiver 2b). Each of the multi-channel receiver 2a and 2b includes an LNA 3, a multiplier 4, a mixer 5, an IF filter 6, and an IF (Intermediate Frequency) variable gain amplifier 7. The LNA 3 amplifies the output signal of the reception phased array unit 31, and outputs it to the mixer 5. Specifically, a (first) reception phase shifter IC provides a (first) composite signal to the (first) multi-channel receiver 2a. Similarly, a (second) reception phase shifter IC provides a (second) composite signal to the (second) multi-channel receiver 2a.

The multiplier 4 multiplies the first raw signal output by the PLL 9 by four, and outputs the first output signal LO1 having a frequency fLO1 to the mixer 5. The mixer 5 mixes the output of the LNA 3 and the output of the multiplier 4, and then outputs the mixture to the IF filter 6. The IF filter 6 band-limits the band to a predetermined intermediate frequency band, and outputs a band-limited signal to the IF variable gain amplifier 7.

The IF variable gain amplifier 7 is configured so that the amplification amount can be adjusted based on the control signal input from the amplification controller 16c of the control unit 16, and amplifies the output of the IF filter 6 and outputs it to an A/D converter 8. The A/D converter 8 converts, from analog to digital, the output of the IF filter 6, and outputs it to the signal processor 17 as the intermediate frequency signal IFOUT. The signal processor 17 includes an FFT (Fast Fourier Transform circuit) 17a, and processes the intermediate frequency signal IFOUT. The signal processor 17 measures the distance from the own device to the target, the relative velocity with the target, and the existence angle of the target by performing a predetermined signal processing.

The principle of measuring the existence angle of the target is described. When the module 1 irradiates the target (target) with radar from the transmission phased array unit 21, the module 1 receives the radar reflected by the target from the reception antenna 34 of the reception phased array unit 31.

The control unit 16 controls a phase φ of the phase shifters 38 of the reception phase shifter ICs 32a and 32b by the phase controller 16b, for controlling directivity of reception pulse beams of the reception channels Rx1 to Rxn of the reception phase shifter ICs 32a and 32b. As a result, each phase in the reception phase shifter ICs 32a and 32b is shifted (i.e., controlled) to the target direction according to the equation (1) described above. Then, the signal processor 17 obtains the intermediate frequency signals IFOUT (first IFOUT and second IFOUT) via the reception phase shifter ICs 32a and 32b and via the general-purpose multi-channel IC 2a and 2b, respectively.

When the signal processor 17 calculates the existence angle of the target seen from the own device, the FFT 17a is used to perform high-speed Fourier transformation on the output digital data of the intermediate frequency signal IFOUT, and the digital signal processing is performed for such data, to calculate a sum signal level Σ and a difference signal level Δ of the intermediate frequency signals IFOUT of the multi-channel receivers 2a, 2b. The signal processor 17 is capable of measuring a reception angle of the radar reflected from the target by the monopulse method, by utilizing a character that an angle difference θ between the reception direction of the reception pulse beam and the existence direction of the target is a function proportional to a ratio of the sum signal level and the difference signal level Δ, as shown in the following equation.

[Equation 2]

$$\theta = f\left(\frac{\Delta}{\Sigma}\right) \quad (2)$$

Hereinafter, the configuration of a self-diagnosis signal generation unit 28 (also known as a Built-In Self-Test circuit or BIST circuit) prepared for self-diagnosis of the phase shifter 25 of the transmission channel 24 is described. When the radar system self-diagnoses the transmission channel 24 as a self-diagnosis device, the general-purpose multi-channel IC 2 outputs the third output signal LO3 to the self-diagnosis signal generation unit 28 and also outputs a self-diagnosis clock signal CLK1 having a frequency fBIST_CLK that satisfies the condition of frequency lower than the frequency fLO3 of the third output signal LO3 to the self-diagnosis signal generation unit 28.

Figure 2:
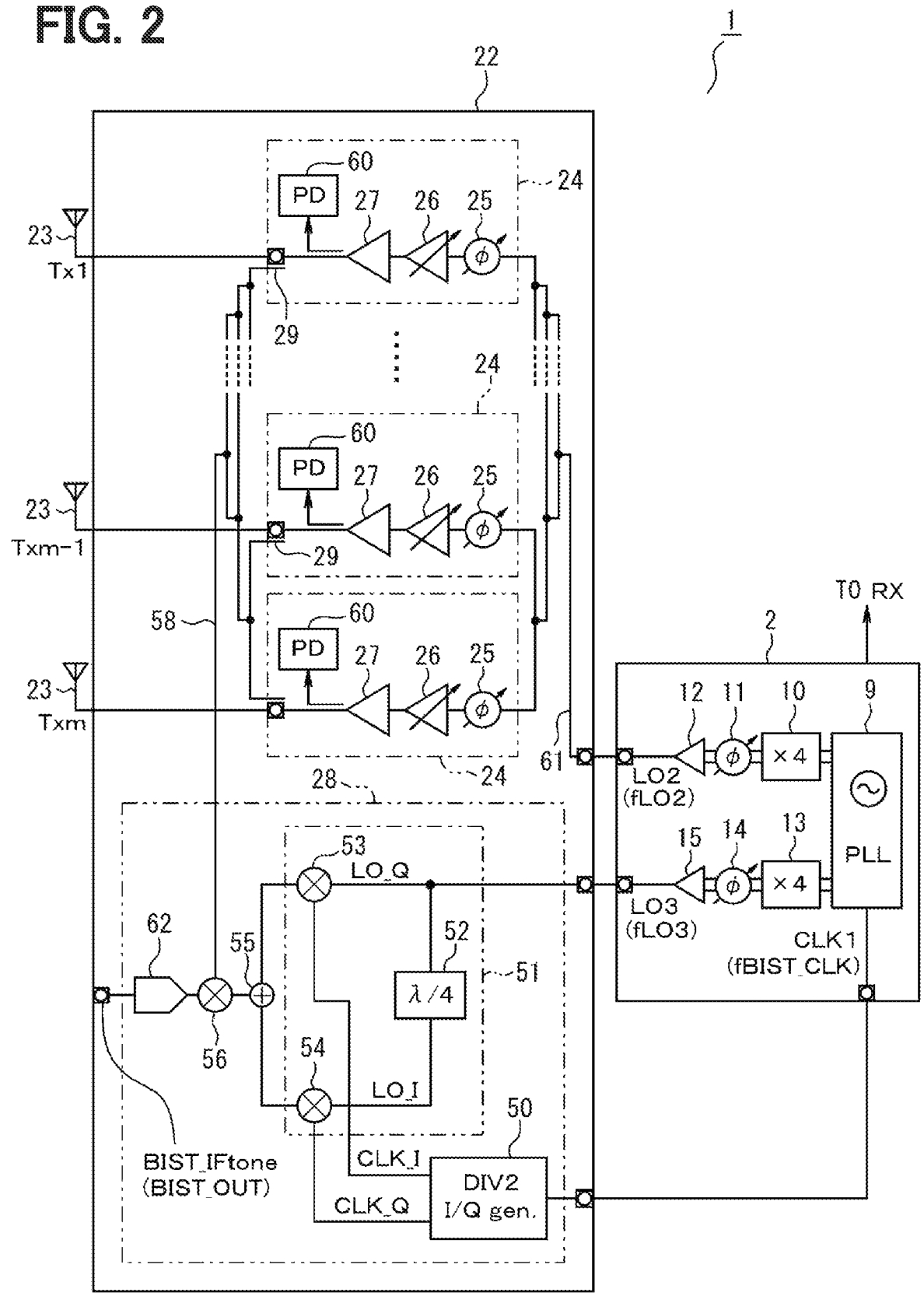
FIG. 2 is an electrical configuration diagram of a self-diagnosis signal generation unit according to the first embodiment.

As shown in FIG. 2, the self-diagnosis signal generation unit 28 includes an IQ signal generator 50, an IQ orthogonal mixer 51, an adder circuit 55, a mixer 56, and an A/D converter 62 as IQ signal generation units (or circuits or components). The self-diagnosis signal generation unit 28 is configured to operate effectively when self-diagnosing the transmission channel 24.

The IQ signal generator 50 is configured by using a frequency divider that is programmable to divide by 2 or more, and generates, as a clock IQ, a self-diagnosis I signal CLK_I and a self-diagnosis Q signal CLK_Q respectively based on division of a self-diagnosis clock signal CLK1 by 2, and outputs the signal to the IQ orthogonal mixer 51. The self-diagnosis I signal CLK_I and the self-diagnosis Q signal CLK_Q are clock signals having a frequency obtained by dividing the frequency fBIST_CLK of the self-diagnosis clock signal CLK1 by (1/n) and are IQ signals orthogonal to each other. Here, n represents an integer of 2 or more.

As shown in FIG. 2, the IQ orthogonal mixer 51 is provided for up-converting a signal based on the third output signal LO3 and the self-diagnosis clock signal CLK1, and has a λ/4 line 52 and a first frequency converter 53, and a second frequency converter 54.

The λ/4 line 52 is used as a 90° phase shifter, and the input signal LO_Q of the third output signal LO3 of the general-purpose multi-channel IC 2 is phase-shifted by 90° and is output to the second frequency converter 54. The first frequency converter 53 mixes the input signal LO_Q of the third output signal LO3 and the self-diagnosis I signal CLK_I, and outputs the mixture to the adder circuit 55. The second frequency converter 54 mixes the output signal LO_1 of the λ/4 line 52 and the self-diagnosis Q signal CLK_Q, and outputs the mixture to the adder circuit 55. The adder circuit 55 adds the outputs of: (i) the first frequency converter 53, and (ii) the second frequency converter 54, and then outputs a composite signal to the mixer 56. In one embodiment, the mixer 56 may facilitate phase inspection by down-converting to help generate the self-diagnosis monitor signal BIST-OUT.

On the other hand, a PAD coupler 29 is configured at a transmission end of each transmission channel 24, and partially couples and obtains the transmission signal output by the transmission channel 24. The PAD coupler 29 is configured by capacitively coupling to the transmission line of the transmission signal of each transmission channel 24, couples the transmission signal of the transmission channel 24, and outputs it to the mixer 56 of the self-diagnosis signal generation unit 28. "PAD" is used conventionally to indicate a pad-shape geometry, or a relatively large and flat contact area used for making electrical connections.

As illustrated in FIG. 1, a transmission line 58 is provided between the output of the self-diagnosis signal generation unit 28 and the PAD coupler 29 of each of the transmission channels Tx1 to Txm. The transmission line 58 is configured as an equal length path which connects the PAD couplers 29 of each of the transmission channels Tx1 to Txm to each other in a tournament manner.

The tournament mode mentioned here is, for example, a mode in which a plurality of linear transmission lines are provided respectively as an equal length path between the PAD coupler 29 of the transmission channel 24 of each of the transmission channels Tx1 to Txm to the input of the self-diagnosis signal generation unit 28 while being connected at a connection point, curved, and/or bent. For example, when the transmission channels Tx1 and Tx2 are adjacent to each other, the PAD couplers 29 are coupled and bent at the midpoint thereof.

The structure of the tournament mode illustrated in FIG. 1 shows an example. As long as the path from the transmission end of the transmission channels Tx1 to Txm to the input of the self-diagnosis signal generation unit 28 is an equal length path on the transmission line 58, the structure is not limited to the above structure.

The transmission line 58 can transmit signals from the PAD coupler 29 at the transmission end of each of the transmission channels Tx1 to Txm to the input of the self-diagnosis signal generation unit 28 via the equal length path, and can transmit the signal with the phase of the transmitted signal matched to each other among the signals of the transmission channels Tx1 to Txm, up to the input of the self-diagnosis signal generation unit 28.

The mixer 56 shown in FIG. 2 mixes the output of the adder circuit 55 with the transmission signal of the transmission channel 24 to obtain a self-diagnosis monitor signal BIST_OUT. The self-diagnosis monitor signal BIST_OUT is processed by the FFT 17a of the signal processor 17. The signal processor 17 diagnoses the accuracy of the phase value of the phase shifter 25 by analyzing the self-diagnosis monitor signal BIST_OUT after the processing of the FFT 17a.

Hereinafter, the principle of self-diagnosis processing of the transmission channel 24 is described. When the radar system starts the self-diagnosis of the transmission channel 24 using the module 1, the general-purpose multi-channel IC 2 outputs the second output signal LO2 to the transmission channel 24, and also outputs the local third output signal LO3 for self-diagnosis of the frequency fLO3 (having the same frequency fLO2 of the second output signal LO2) to the self-diagnosis signal generation unit 28. Further, the general-purpose multi-channel IC 2 outputs a self-diagnosis clock signal CLK1 having a frequency fBIST_CLK that satisfies a frequency condition lower than the frequency fLO3 of the third output signal LO3.

Here, the principle is that the frequency of the desired one-tone wave output by the adder circuit 55 to the mixer 56 is the upper frequency fRF+, the image wave is the lower frequency fRF−, and the signal output by the adder circuit 55 is the one-tone signal. The output of the first frequency converter 53 can be expressed by the following equation (3).

[Equation 3]

$$\sin(\omega_{LO\_UP}t)\cos(\omega_{BIST\_CLK}t)=\tfrac{1}{2}[\cos\{(\omega_{LO\_UP}+\omega_{BIST\_CLK})t\}+\sin\{(\omega_{LO\_UP}-\omega_{BIST\_CLK})t\}] \quad (3)$$

In the equation (3), an angular frequency ωLO_UP represents an angular frequency 2π×fLO3 converted corresponding to the frequency fLO3 of the third output signal LO3. Further, an angular frequency ωBIST_CLK represents an angular frequency π×fBIST_CLK (=2π×fBIST_CLK/2) converted from each of the frequency fBIST_CLK/2 of I output and Q output of the IQ signal generator 50. Similarly, the output of the second frequency converter 54 is represented by the following equation (4).

[Equation 4]

$$\cos(\omega_{LO\_UP}t)\sin(\omega_{BIST\_CLK}t)=\tfrac{1}{2}[\cos\{(\omega_{LO\_UP}+\omega_{BIST\_CLK})t\}-\sin\{(\omega_{LO\_UP}-\omega_{BIST\_CLK})t\}] \quad (4)$$

The equation (4) shows a relative calculation equation in consideration of the phase difference from the equation (3). When the adder circuit 55 combines/synthesizes the output of the first frequency converter 53 and the output of the second frequency converter 54, the second term on the right side of the equation (3) and the second term on the right side of the equation (4) cancel with each other, and the output of the adder circuit 55 can be represented as the following equation (5).

[Equation 5]

$$\sin(\omega_{LO\_UP}t)\cos(\omega_{BIST\_CLK}t)+\cos(\omega_{LO\_UP}t)\sin(\omega_{BIST\_CLK}t)=\cos\{(\omega_{LO\_UP}+\omega_{BIST\_CLK})t\} \quad (5)$$

It can be seen that the adder circuit 55 outputs a one-tone signal having an angular frequency (ωLO_UP+ƒBIST_CLK) in principle by combining the output of the first frequency converter 53 and the output of the second frequency converter 54.

That is, the adder circuit 55 outputs, to the mixer 56, a one-tone signal of a desired wave separated from the frequency fLO3 of the third output signal LO3 by a predetermined offset frequency fBIST_CLK/2.

Figure 3:
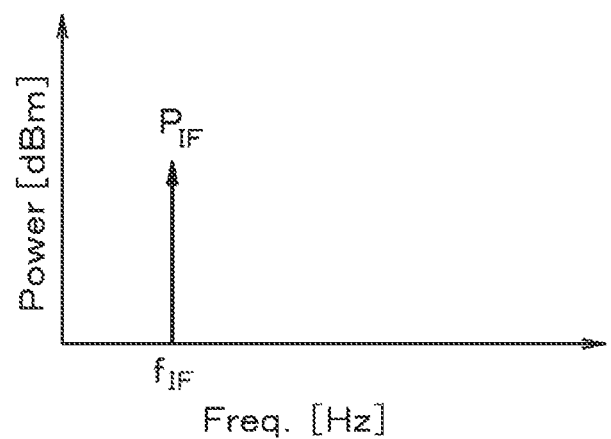
FIG. 3 is a spectrum characteristic of an intermediate frequency signal according to the first embodiment.

By mixing the one-tone signal of the desired wave with the transmission signal of the transmission channel 24, the mixer 56 outputs the one-tone signal of the frequency fIF (for example, fBIST_CLK/2) as the self-diagnosis monitor signal BIST_OUT as shown in FIG. 3. The signal processor 17b performs a high-speed Fourier transformation on the self-diagnosis monitor signal BIST_OUT by the FFT 17a, and performs phase correction so as to obtain a desired directivity while changing the phase of the phase shifter 25. The signal processor 17b can accurately evaluate the phase of the phase shifter 25 by performing phase evaluation using a one-tone signal having a frequency of fIF. In such case, deterioration of the phase evaluation due to the image signal can be prevented.

Figure 4:
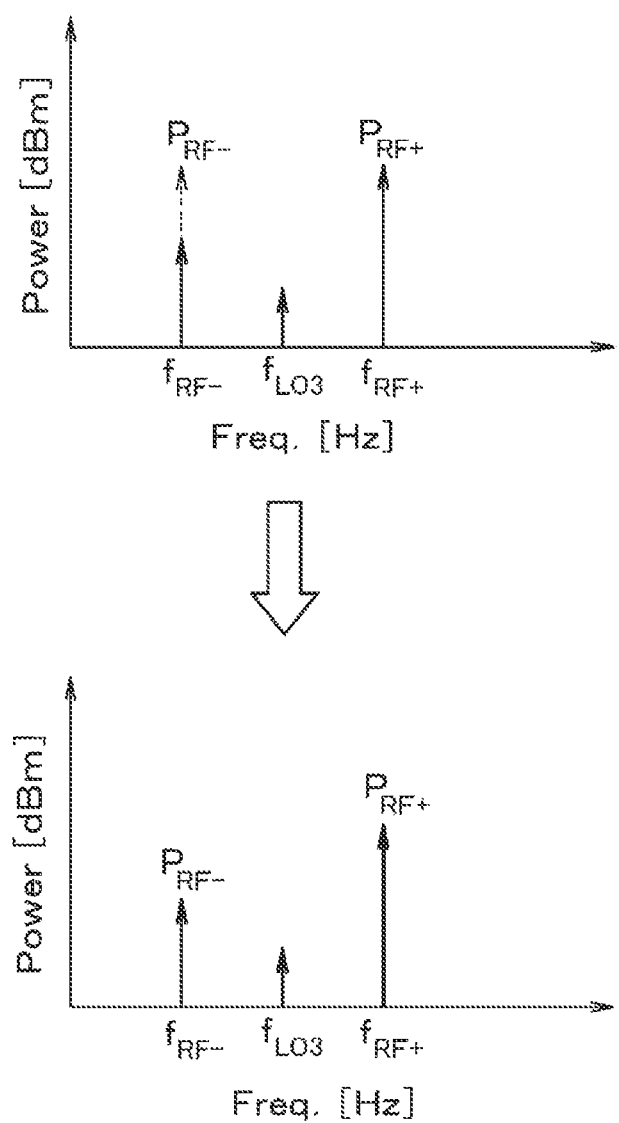
FIG. 4 is a simulation result of an output power of an adder circuit according to the first embodiment.

Further, the inventor of the present application verifies the degree of suppression of the image wave by simulation for the configuration of FIG. 2. As shown in FIG. 4 showing the simulation result of the output of the adder circuit 55, it has been confirmed that the power PRF+ of the upper frequency fRF+ which is the desired wave can obtain a larger gain than the power PRF− of the lower frequency fRF− which is the image wave. Further, it has been confirmed that the local signal leakage of the frequency fLO3 based on the third output signal LO3 can be reduced to a considerable extent compared to the desired wave, and it has been confirmed that the configuration is sufficiently practical. The tone of the third output signal LO3 in FIG. 4 is a diagram showing the frequency relationship, and, as described above, it is suppressed to −40 dBc or less at an UPMIX output end of the mixer 56.

When the control unit 16 changes the phase value of the phase shifter 25 of a transmission channel (for example, Tx1) by the phase controller 16b from 0 to 90°, it has been confirmed that a tone signal can be obtained as the self-diagnosis monitor signal BIST_OUT having a substantially constant power. At such time, it has been confirmed that the image component can be suppressed by about several tens of dB. It has been confirmed that the phase of the self-diagnosis monitor signal BIST_OUT is also changed as the control unit 16 changes the phase value of the phase shifter 25 by the phase controller 16*b*. The signal processor 17 can reliably evaluate the phase value of the phase shifter 25 by using the self-diagnosis monitor signal BIST_OUT having a frequency dependent on the frequency fBIST_CLK of the self-diagnosis clock signal CLK1.

As described above, according to the present embodiment, the self-diagnosis signal generation unit 28 generates the self-diagnosis monitor signal BIST_OUT by mixing, with the transmission signal of the transmission channel 24, the generated signal that is generated based on the third and fourth output signals LO3, LO4 output in synch with the first and second output signals LO1, LO2. The general-purpose multi-channel IC 2 can self-diagnose the transmission channel 24 while effectively utilizing the third output signal LO3 and the fourth output signal CLK1 that are synchronously output with the first output signal LO1 and the second output signal LO2.

At such time, since the general-purpose multi-channel IC 2 generates the third output signal LO3 for self-diagnosis and the clock signal CLK1 for self-diagnosis using the PLL 9 of the same block, there is no need to use the integrated circuit using a plurality of PLLs. Moreover, by using the general-purpose multi-channel IC 2, the third output signal LO3 for self-diagnosis and the clock signal for self-diagnosis CLK1 are generated to have a high correlation with the frequency change of the reference clock CLK and the frequency characteristic change by the change of the external environment fluctuation. As a result, a high-quality on-chip BIST signal source with good C/N (or SNR) and frequency accuracy can be generated by combining signals that can be generated from the general-purpose multi-channel IC 2. Further, by synthesizing the output of the transmission channel 24 via the coupler 29 and down-converting it to a low frequency band, the transmission phase shifter IC 22 can be self-diagnosed even with an inexpensive device.

Further, since the adder circuit 55 is configured to add the outputs of the first frequency converter 53 and the second frequency converter 54 to output a one-tone signal to the mixer 56, the image interference of the self-diagnosis monitor signal BIST_OUT that is output by the mixer 56 can be suppressed. After the signal processor 17 obtains the A/D-converted self-diagnosis monitor signal BIST_OUT by the A/D converter 62 and the digital data of the signal BIST_OUT is FFT-processed by the FFT 17*a*, the phase value of the phase shifter 25 can be accurately evaluated according to the signal based on the frequency fBIST_CLK of the self-diagnosis clock signal CLK1.

The signal processor 17 can perform the diagnosis of the phase value of the phase shifter 25 at a relatively low frequency (for example, 20 MHz) that is dependent on the self-diagnosis clock signal BIST_CLK, and as a result, the phase error of the phase shifter 25 can be determined with high accuracy.

If the output power of one tone by the adder circuit 55 is sufficiently high, the control unit 16 may reduce the amplification degree of the variable gain amplifier 26 by the amplification controller 16*c*, to reduce the output of the transmission channel 24 to the utmost, possible limit. As a result, the radar output to the outside can be substantially stopped at the time of self-diagnosis. In such case, the output of the adder circuit 55 is treated as a local signal of the mixer 56.

Second Embodiment: Hybrid Coupler 52*a*

Figure 5:
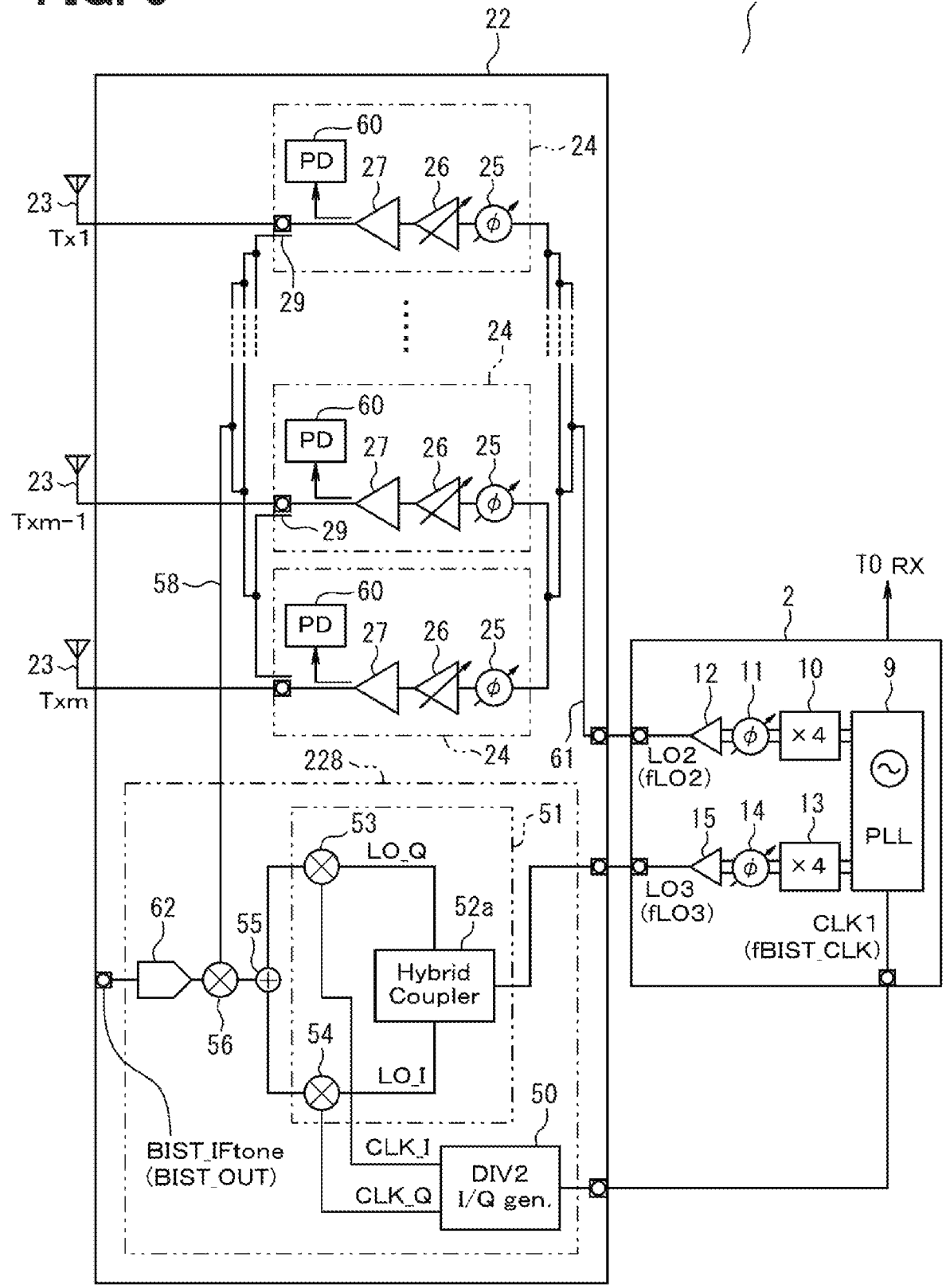
FIG. 5 is an electrical configuration diagram of the self-diagnosis signal generation unit according to a second embodiment.

FIG. 5 shows an explanatory diagram according to the second embodiment. The transmission phase shifter IC 22 of a module 201 shown in FIG. 5 includes a self-diagnosis signal generation unit 228. The self-diagnosis signal generation unit 228 has a configuration that replaces the self-diagnosis signal generation unit 28 described in the first embodiment, and has the same configuration as the first embodiment, and the same parts are designated by the same reference numerals. The explanation is omitted. As shown in FIG. 5, the self-diagnosis signal generation unit 228 may include a hybrid coupler 52*a* as a 90° phase shifter instead of the λ/4 line 52. The hybrid coupler 52*a* sets the third output signal LO3 as local IQ signals LO_1 and LO_Q having 90° phases different from each other, respectively outputted to the first frequency converter 53 and to the second frequency converter 54.

Therefore, the first frequency converter 53 and the second frequency converter 54 also output, respectively, signals whose phases are 90° phase change from each other. In the present embodiment, a one-tone signal can be output to the mixer 56 in principle by operating in the same manner as in the first embodiment. Therefore, the same effect as that of the first embodiment is obtained in the present embodiment.

Third Embodiment: Delayer 59

Figure 6:
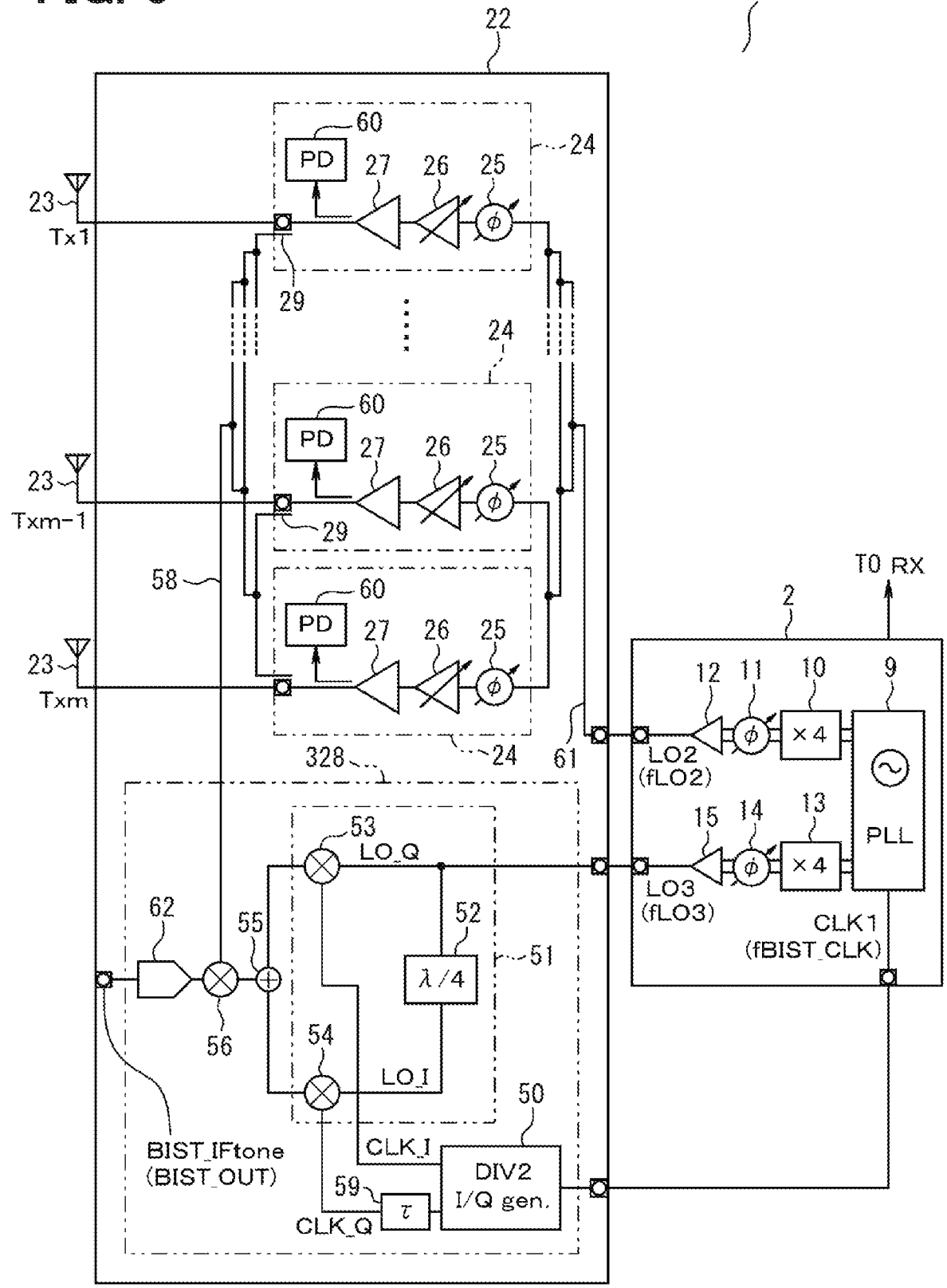
FIG. 6 is an electrical configuration diagram of the self-diagnosis signal generation unit according to a third embodiment.

FIG. 6 shows an explanatory diagram of the third embodiment. A transmission phase shifter IC 22 of a module 301 shown in FIG. 6 has a self-diagnosis signal generation unit 328 configured therein. The self-diagnosis signal generation unit 328 has a configuration that replaces the self-diagnosis signal generation unit 28 described in the first embodiment. Other parts have the same configuration as that of the first embodiment, and the same parts are designated by the same reference numerals and description thereof is omitted, and the configuration of the self-diagnosis signal generation unit 328 is described in the following.

The self-diagnosis signal generation unit 328 includes the IQ orthogonal mixer 51, the adder circuit 55, the mixer 56, and a delayer 59. The delayer 59 is configured at the output of one or both of the self-diagnosis Q signal CLK_Q (as shown in FIG. 6) and the self-diagnosis I signal CLK_I of the IQ signal generator 50, for improving the IQ balance between the self-diagnosis I signal CLK_I and the self-diagnosis Q signal CLK_Q by delaying the output of the self-diagnosis Q signal CLK_Q and/or the self-diagnosis I signal CLK_I. The delayer 59 is provided to compensate for a phase error or the like based on individual variations of the IQ signal generator 50, the IQ orthogonal mixer 51, the adder circuit 55, and the mixer 56, which are configured in the self-diagnosis signal generation unit 328. That is, the delayer 59 is capable of compensating the error.

The signal processor 17 is used as a detection unit that monitors the output of the self-diagnosis monitor signal BIST_OUT by the FFT 17*a*, and the control unit 16 changes an amount of delay of the delayer 59 to reduce the detected image signal. As a result, an amount of image suppression can be increased.

Fourth Embodiment: Second Phase Shifter 57

Figure 7:
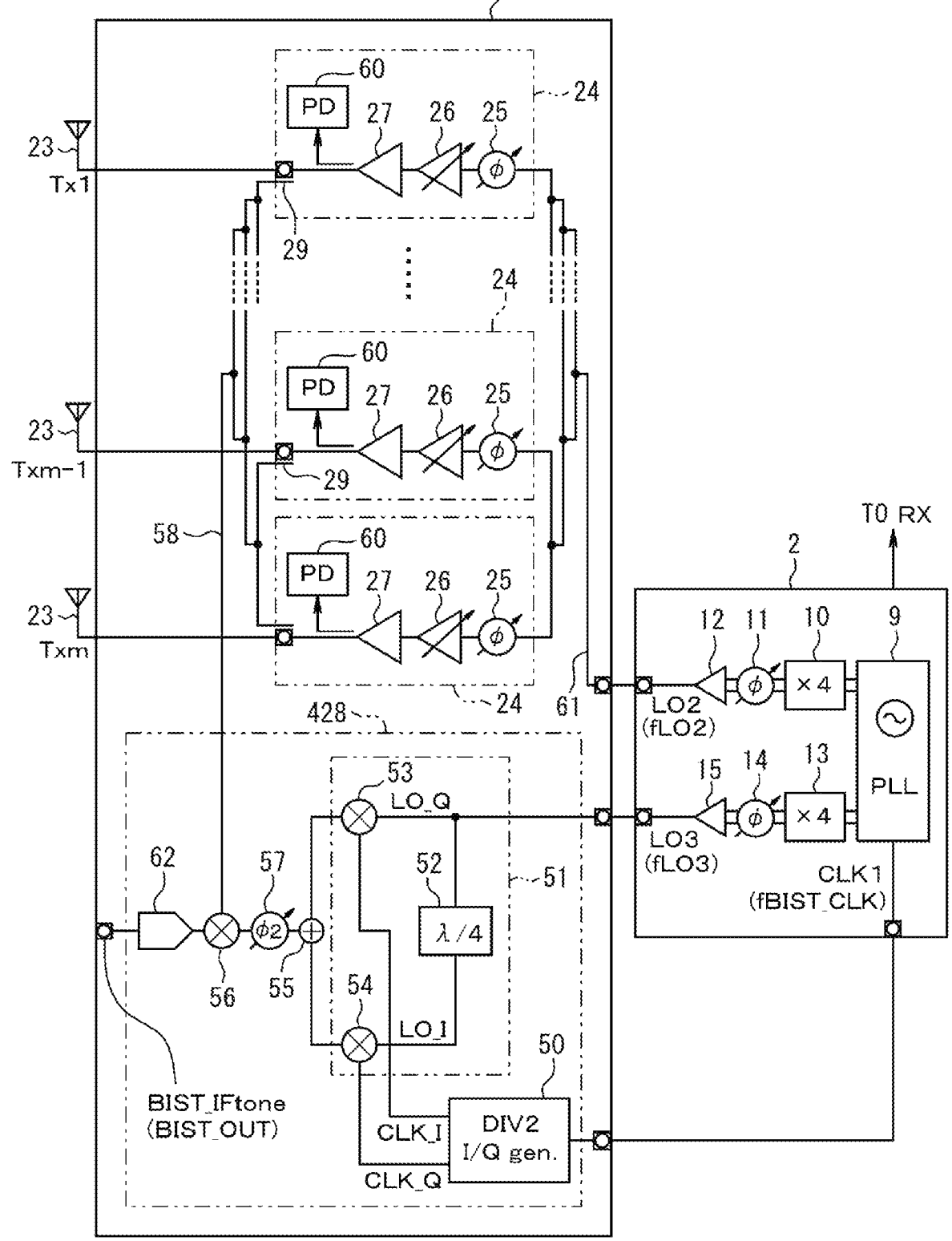
FIG. 7 is an electrical configuration diagram of the self-diagnosis signal generation unit according to a fourth embodiment.

FIG. 7 shows an explanatory diagram of the fourth embodiment. The transmission phase shifter IC 22 of a module 401 shown in FIG. 7 is configured with a self-diagnosis signal generation unit 428. The self-diagnosis signal generation unit 428 has a configuration that replaces the self-diagnosis signal generation unit 28 described in the first embodiment, and the other configurations are the same as those in the first embodiment, and the description is omitted. The configuration of the generation unit 428 is described in the following.

The self-diagnosis signal generator 428 includes the IQ signal generator 50, the IQ orthogonal mixer 51, the adder circuit 55, a second phase shifter 57, and the mixer 56.

The second phase shifter 57 is configured so that a phase φ2 can be adjusted based on the phase control signal by the phase controller 16b of the control unit 16, and inputs a signal obtained by adjusting the output of the adder circuit 55 by an amount of the phase φ2 to the mixer 56. That is, the second phase shifter 57 is provided to appropriately adjust the output phase of the adder circuit 55.

While the signal processor 17 monitors the image signal of the output of the self-diagnosis monitor signal BIST_OUT, the phase controller 16b of the control unit 16 adjusts and controls the phase φ2 of the second phase shifter 57, thereby improving an image suppression effect.

Fifth Embodiment: Two Transmission Channels On

Figure 8:
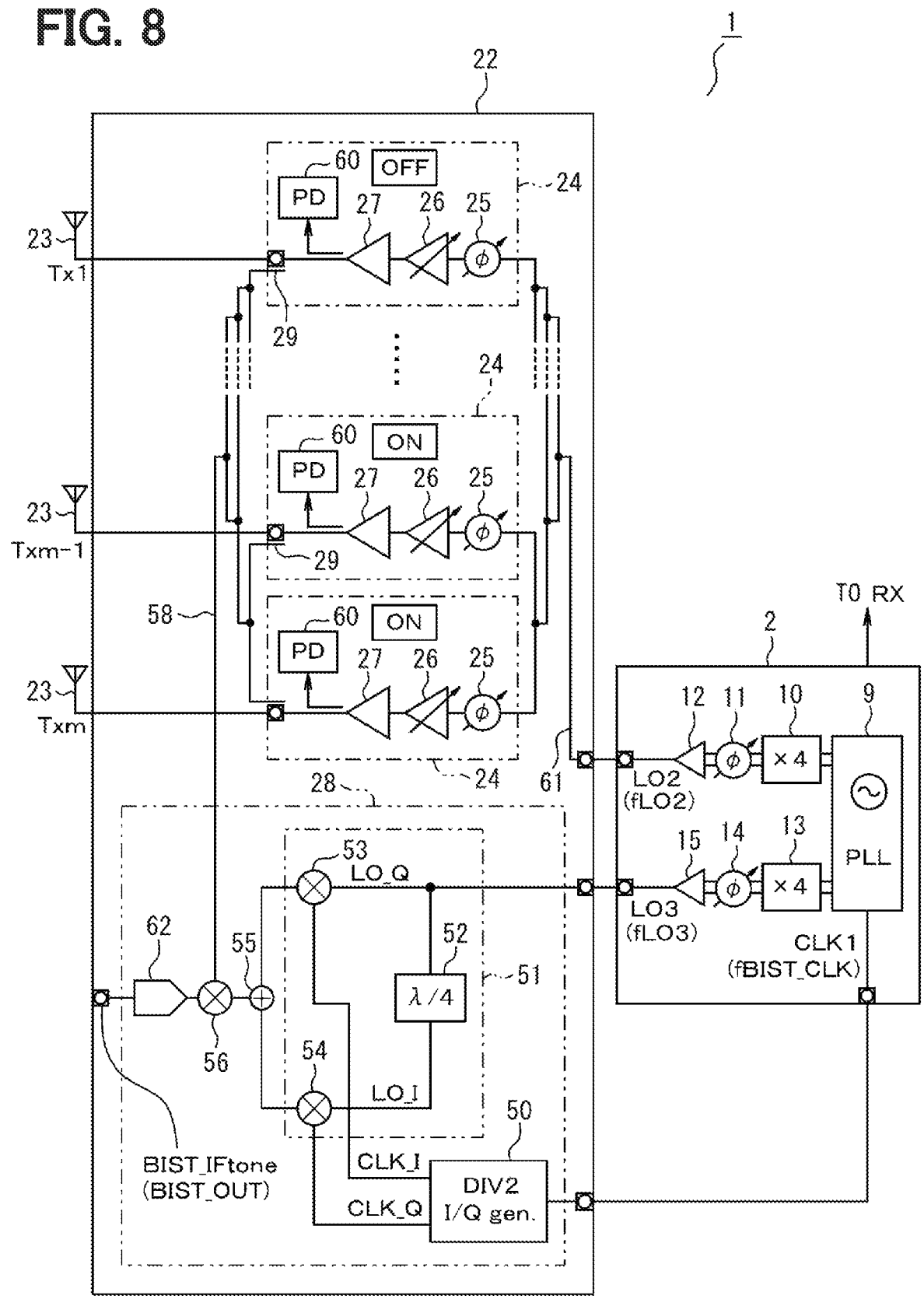
FIG. 8 is an explanatory diagram of an operating state of a transmission channel according to a fifth embodiment.
Figure 9:
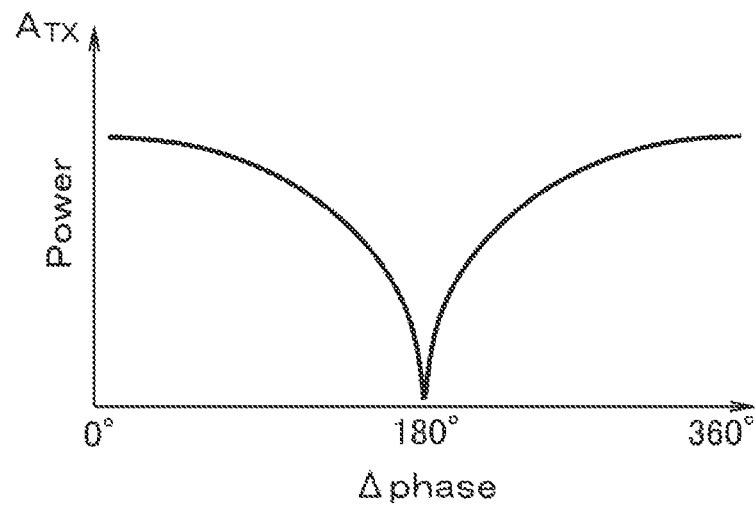
FIG. 9 is a composite amplitude characteristic with respect to a relative phase difference of transmission signals between adjacent transmission channels in the fifth embodiment.
Figure 10:
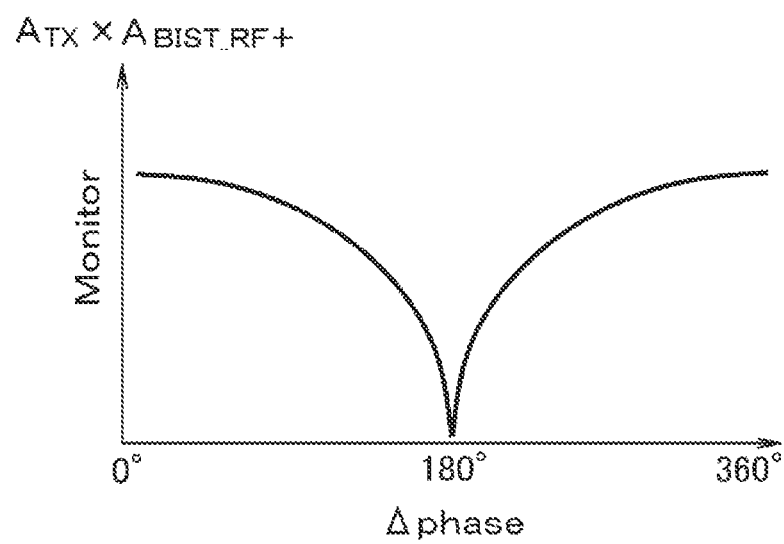
FIG. 10 is a monitor signal intensity characteristic of a self-diagnosis monitor signal with respect to a relative phase difference of a transmission signal between adjacent transmission channels in the fifth embodiment.

FIG. 8 to FIG. 10 show explanatory diagrams of the fifth embodiment. The control unit 16 adjusts the amplification degree of the variable gain amplifier 26 of the transmission channel 24 of each of the transmission channels Tx1 to Txm by the amplification controller 16c, thereby effectively outputting the transmission signals from two transmission channels (here, for example, Txm−1 and Txm) while stopping output of the transmission signals from other transmission channels (here, for example, Tx1 to Txm−2). That is, the transmission channel 24 of each of the plurality of transmission channels Tx1 to Txm can individually output a transmission signal based on the control signal by the amplification controller 16c of the controller 16.

In FIG. 9 a null monitor method enables checking not only the relative phase, but also enables checking a relative amplitude.

Further, the control unit 16 allows the signal processor 17 to monitor the self-diagnosis monitor signal BIST_OUT while changing the phase value of the phase shifter 25 of the transmission channel 24 of one transmission channel (here, for example, Txm−1) with the phase value of the phase shifter 25 of the transmission channel 24 of the other transmission channel (here, for example, Txm) fixed to a certain value.

If the output level of the adder circuit 55 is kept constant, a combined amplitude ATX of the transmission channels Txm−1 and Txm changes depending on the phase value of each of the phase shifters 25 of each of the transmission channels Txm−1 and Txm. At such time, as shown in FIG. 9, the combined amplitude ATX of the transmission channels Txm−1 and Txm changes according to a relative phase difference ΔPhase of the transmission signal between the transmission channels Txm−1 and Txm.

In principle, when the phase difference between the phase shifters 25 of each of the transmission channels Txm−1 and Txm becomes 180° (180 degrees), the transmission signals of each of the transmission channels Txm−1 and Txm weaken each other, thereby lowering the combined amplitude ATX of the transmission channels Txm−1, Txm to the lowest level. As shown in FIG. 10 showing a monitor signal intensity of the self-diagnosis monitor signal BIST_OUT, when the phase value of the phase shifter 25 of the transmission channel Txm−1 and the phase value of the phase shifter 25 of the transmission channel Txm has a relative phase difference ΔPhase of 180° with each other, the monitor signal intensity of the self-diagnosis monitor signal BIST_OUT becomes the lowest level.

For example, consider a case where the phase value of the phase shifter 25 of the transmission channel Txm−1 is offset by 2° with respect to the phase value of the phase shifter 25 of the transmission channel Txm. When the relative phase difference ΔPhase becomes 182° in a setting that the control unit 16 changes the phase value of the phase shifter 25 of the transmission channel Txm−1 while keeping the phase value of the phase shifter 25 of the transmission channel Txm fixed, the monitor signal intensity becomes the lowest level. Therefore, the signal processor 17 can detect that the phase shifters 25 of the transmission channels Txm−1 and Txm are relatively offset by 2°.

As a result, the signal processor 17 can make a relative comparison of the phase characteristics of the phase shifters 25 of the two adjacent transmission channels Txm−1 and Txm. The phase setting condition of the phase shifter 25 when the monitor signal intensity of the self-diagnosis monitor signal BIST_OUT becomes the lowest is a condition that satisfies the relative phase difference ΔPhase=180°. Therefore, it is possible to compensate for the phase error when determining the relative angle in which the target exists by using the calculation result of the monitor signal intensity that is dependent on the relative phase difference ΔPhase.

This processing content can be extended to the diagnostic processing of all transmission channels Tx1 to Txm of the transmission phase shifter IC 22. The control unit 16 can control the combined signals of all transmission channels Tx1 to Txm to be weakened with each other in principle, by setting the phase value of the phase shifter 25 of the odd-numbered transmission channels Tx1, Tx3, Tx5, . . . to 0° and setting the phase value of the phase shifter 25 of the even-numbered transmission channels Tx2, Tx4, Tx6, . . . to 180°, among the transmission channels Tx1 and Txm of the transmission phase shifter IC 22.

Therefore, while the control unit 16 fine-tunes the phase values of the phase shifters 25 of all transmission channels Tx1 to Txm, by detecting the monitor signal intensity of the self-diagnosis monitor signal BIST_OUT by using the signal processor 17, a relationship between the phase values of the phase shifters 25 of the transmission channels Tx1 to Txm can be found, which satisfies the condition that the combined amplitudes ATX of the transmission signals of the transmission channels Tx1 to Txm is weakened with each other. This makes it possible to compensate for the phase error when determining the relative direction in which the target exists.

In the configuration described above, an example of deriving the phase relationship of the phase shifter 25 that satisfies the condition that the transmission signals of a plurality of transmission channels (for example, Txm−1 and Txm) weaken each other to control the monitor signal intensity of the self-diagnosis monitor signal BIST_OUT to have the lowest level is shown. However, the present disclosure is not limited to such configuration.

By the monitoring of the self-diagnosis monitor signal BIST_OUT by the signal processor 17, the phase relationship of the phase shifter 25 that satisfies the condition that the transmission signals of the two transmission channels Txm−1 and Txm intensify each other and the combined amplitude ATX becomes the highest level may be found. Note that, in principle, when the relative phase difference ΔPhase between the two transmission channels Txm−1 and Txm is 0° and 360°, the transmission signals of the two adjacent transmission channels Txm−1 and Txm intensify each other. Therefore, the monitor signal intensity of the self-diagnosis monitor signal BIST_OUT becomes the highest level.

Extending the above to the diagnostic processing of all transmission channels Tx1 to Txm of the transmission phase shifter IC 22, the control unit 16 can establish a relationship in which the transmission signals of all transmission channels Tx1 to Txm intensify each other in principle, by controlling the phase values of the phase shifters 25 to the same value in all transmission channels Tx1 to Txm of the transmission phase shifter IC 22.

Therefore, the control unit 16 can, by fine-tuning the phase values of the phase shifters 25 of all transmission channels Tx1 to Txm, derive the relationship that satisfies the condition in which the combined amplitudes ATX of the transmission signals of all transmission channels Tx1 to Txm intensify each other to the utmost.

As described above, according to the present embodiment, when the control unit 16 outputs a transmission signal from two adjacent transmission channels (for example, Txm−1 and Txm), while changing the phase value of the phase shifter 25 of one transmission channel Txm−1, the combined power changing in corresponding manner to the relative phase difference ΔPhase of the phase shifters 25 of the two transmission channels Txm−1 and Txm is detected based on the monitoring result of the signal processor 17 monitoring the self-diagnosis monitor signal BIST_OUT. Therefore, the signal processor 17 can easily detect the relative phase difference ΔPhase between two adjacent transmission channels Txm−1 and Txm.

Sixth Embodiment: PCB, Capacitive Coupling

Figure 11:
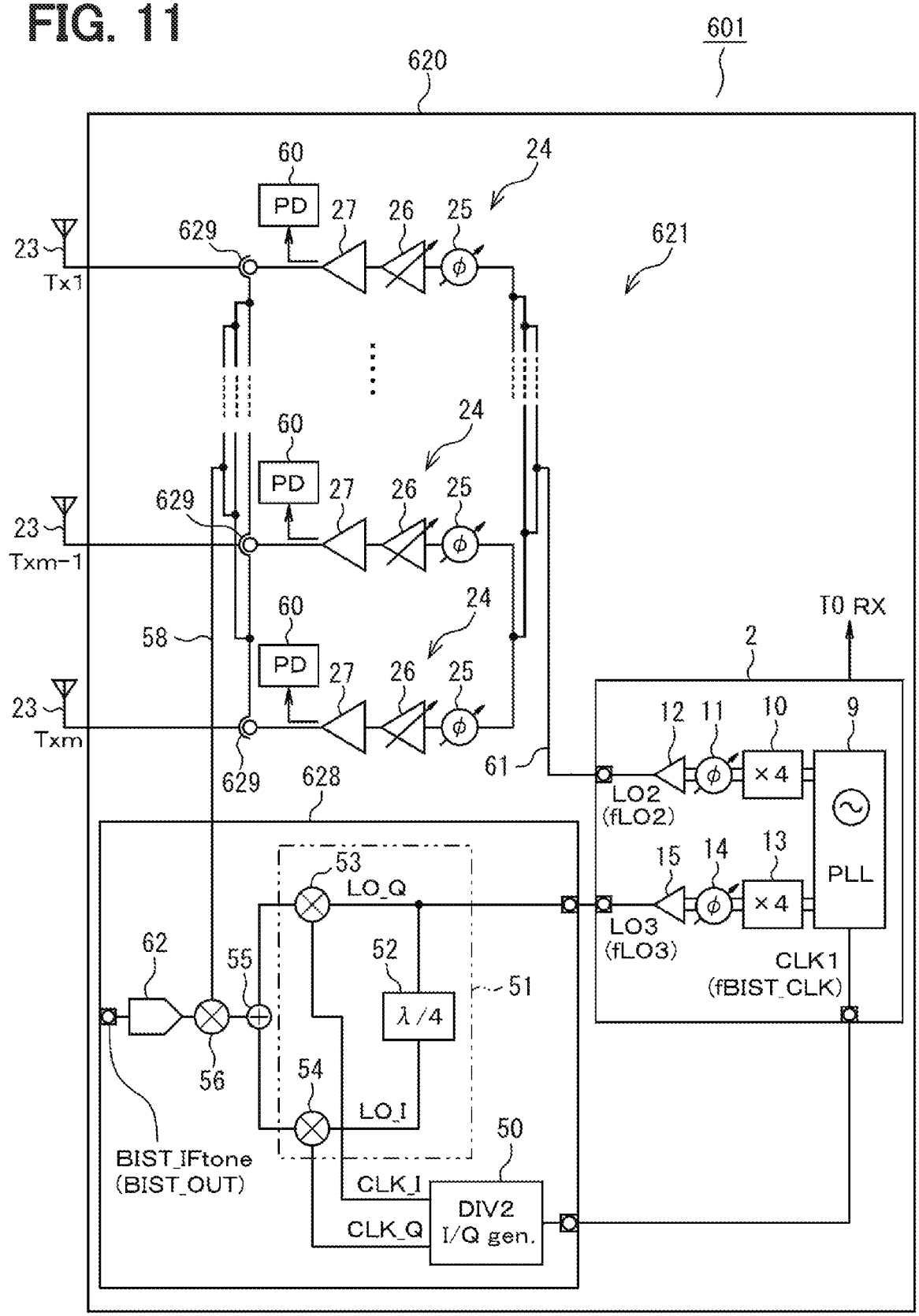
FIG. 11 is an electrical configuration diagram of a transmission phased array module according to a sixth embodiment.
Figure 12:
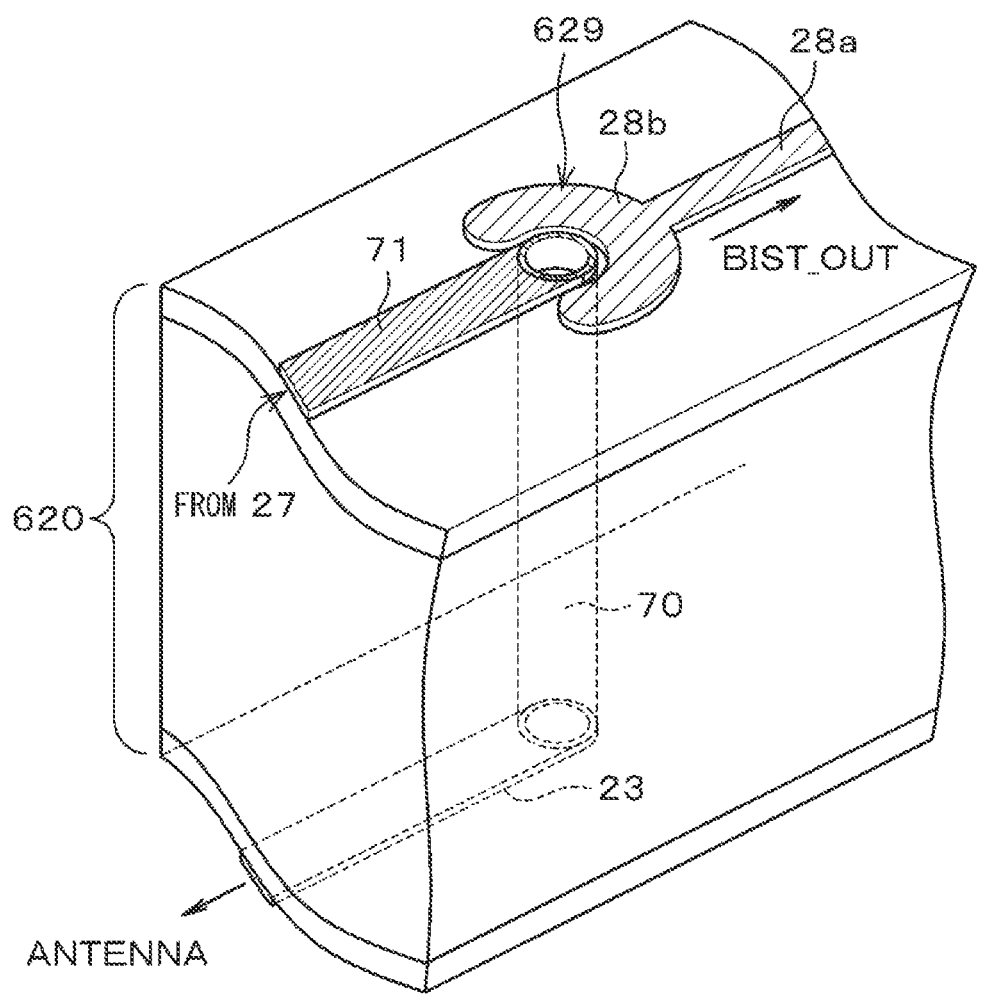
FIG. 12 is a perspective view schematically showing a structure of a PCB wiring coupler according to the sixth embodiment.

FIGS. 11 and 12 show explanatory views of the sixth embodiment. As illustrated in FIG. 11, a module 601 may be configured that the transmission phase shifter IC 22 has a configuration which is implemented by using discrete components in part or as a whole, i.e., without integration of the entire IC 22. As illustrated in FIG. 11, the module 601 is configured by mounting a general-purpose multi-channel IC 2 and a diagnostic IC 628 on the surface layer of a PCB (Printed Circuit Board) 620. The diagnostic IC 628 has a configuration in which a self-diagnosis signal generation unit 28 is integrated. Although the reception phased array unit 31 is not shown in FIG. 11, it may be mounted on the PCB 620 or may be mounted on another PCB.

The PCB 620 has a copper foil surface formed on the top layer and the back layer, and a dielectric layer is sandwiched inside the copper foil surface. The PCB 620 has a circuit of a transmission channel 24 mounted on the surface layer, and has a transmission antenna 23 formed flat on the back layer. See also FIG. 12. As illustrated in FIG. 11, a transmission phased array unit 621 of the present embodiment comprises a phase shifter 25, a variable gain amplifier 26, and a power amplifier 27 on the surface layer of the PCB 620, each of which is a discrete component.

When the transmission phased array unit 621 is composed of discrete components on the surface layer of the PCB 620, it is preferable to form a PCB wiring coupler 629 at the transmission end of the transmission channel 24 as illustrated in FIG. 12.

A through-hole via 70 and a transmission wiring 71 are formed as a transmission line between the transmission antenna 23 and the power amplifier 27. The through-hole via 70 is formed so as to penetrate between the surface layer and the back layer of the PCB 620 and make a conductive connection. One end of the transmission wiring 71 is connected to a surface land of the through-hole via 70, and the other end is connected to an output end of the power amplifier 27. A BIST wiring 28a includes a coupling portion 28b formed so as to surround a part of the surface land of the through-hole via 70 and to be separated from the surface land.

The PCB wiring coupler 629 is configured by capacitively coupling the transmission wiring 71 and the coupling portion 28b. Therefore, the diagnostic IC 628 can input a part of the transmission signal from the transmission end of the transmission channel 24 through the coupling portion 28b of the PCB wiring coupler 629.

The transmission phased array unit 621 is not limited to a single-body transmission phase shifter IC 22, and may include a transmission phase shifter IC 22 composed of discrete components in part or as a whole.

Figure 13:
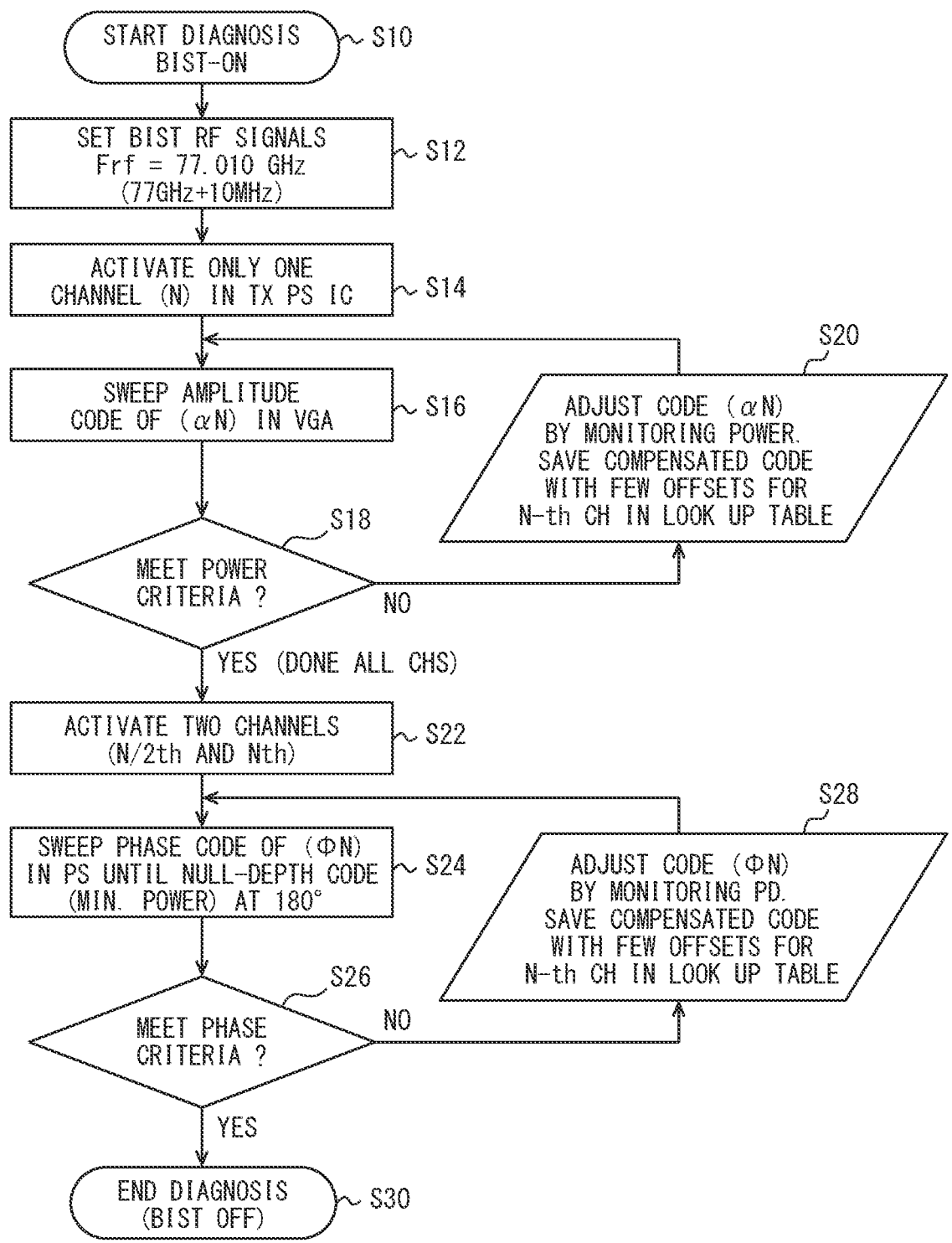
FIG. 13 is a flowchart for two channel measurements as a diagnosis focusing on amplitude and phase.

FIG. 13 is a first flowchart for two channel measurements as a diagnosis focusing on amplitude and phase. The flowchart in FIG. 13 includes steps S10, S12, S14, S16, S18, S20, S22, S24, S26, S28, and S30. The flowchart discloses an amplitude check and then a phase check.

Step S12 may also activate BIST-related signals from synchronized PLL in the transceiver IC. For example, fLO1, 3=77.000 GHz, CLK1=20 MHz (CLK_I=CLK_Q=10 MHz) and fRF=77.010 GHz.

In step S22, note that N/2th means the center of the channel among N-channels used as a reference.

Figure 14:
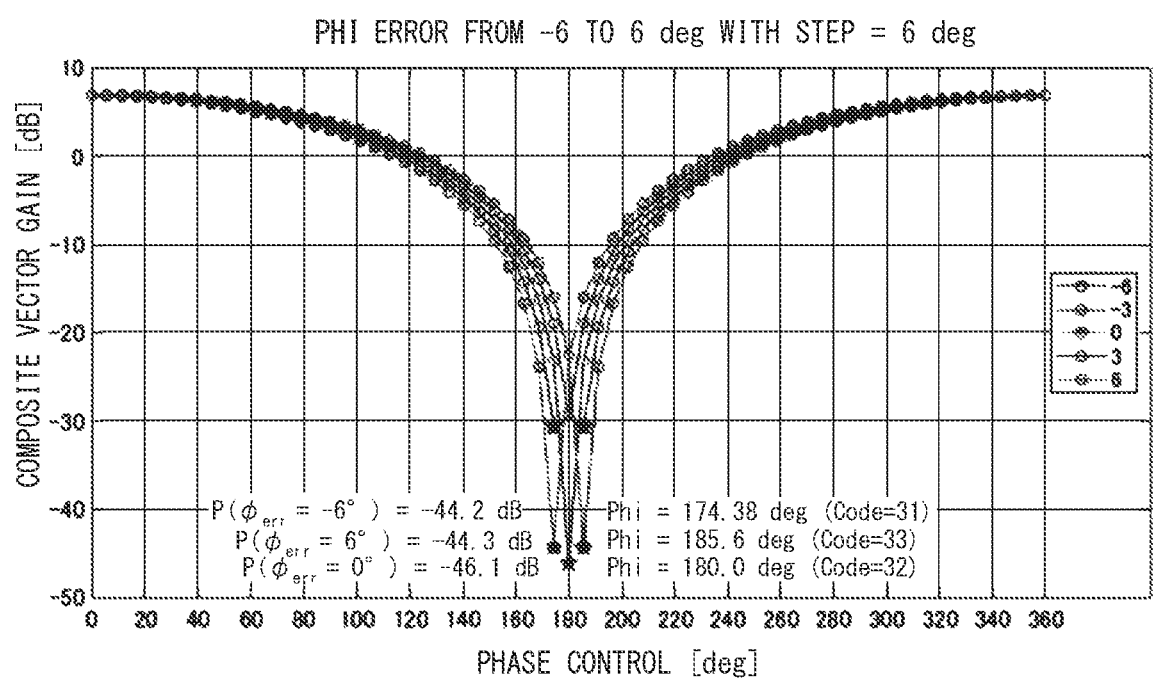
FIG. 14 is a simulation diagram of FIG. 13.

FIG. 14 is a simulation result of FIG. 13, using a phase error.

In FIGS. 13 and 14, at least two kinds of approaches are possible to measure the power variations according to αN settings and the null-depth variations according to ΦN settings:
  i) using a power detector (PD) in a PS IC (fRF_BIST), and
  ii) monitoring the down-converted BIST IF signal (fBIST_IF=10 MHz for example) an FFT analysis of ADC outputs (62 in FIG. 2) or directly monitoring analog BIST IFOUT signals of the mixer (56 in FIG. 2) on a spectrum analyzer.

The simulation result in FIG. 14 includes a condition of a phase error $\phi err$ to evaluate a null-depth change. A 6 bit shifter may be used, yielding a 5.6 degree step angle used for discrete data.

Figure 15:
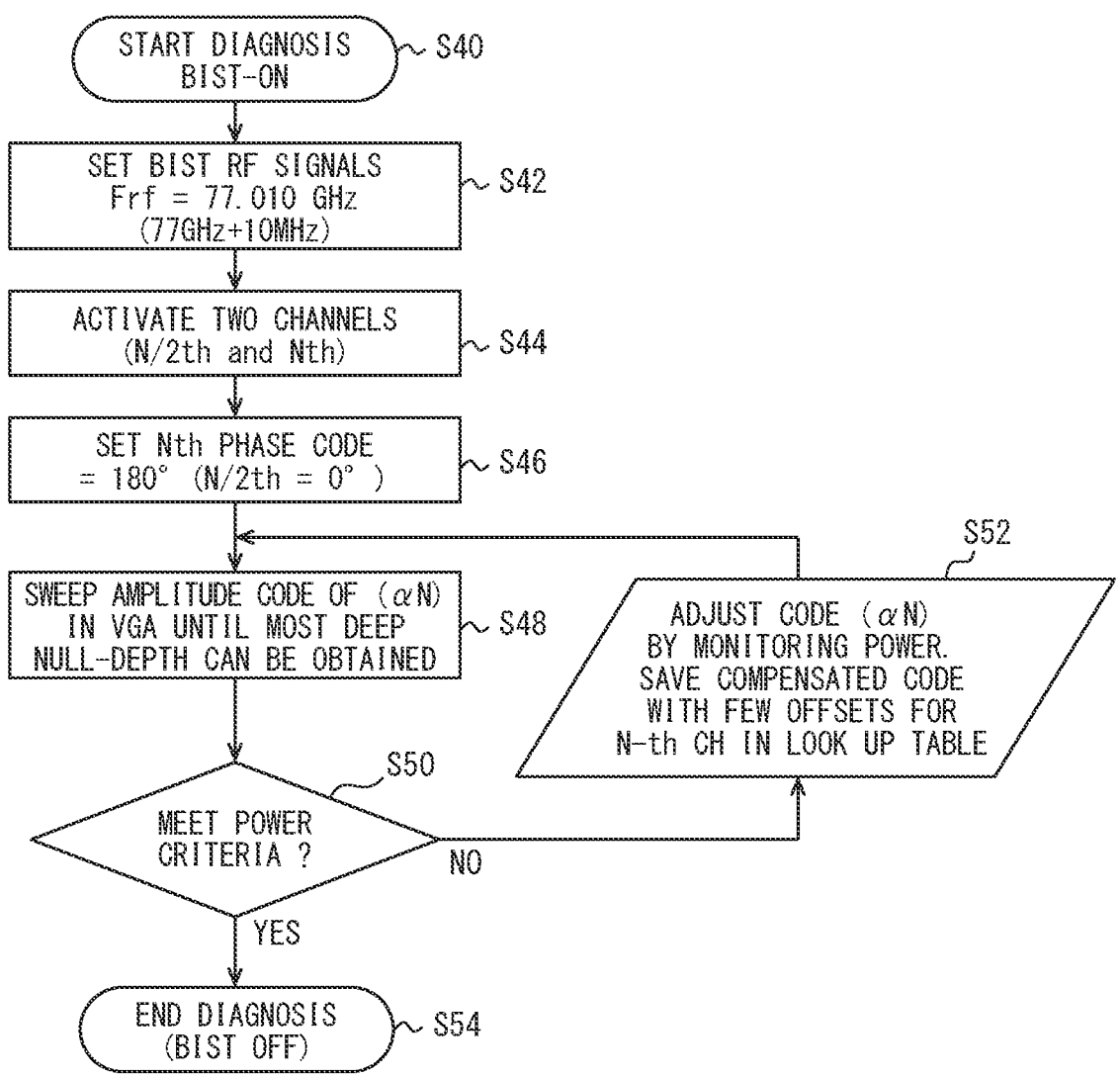
FIG. 15 is a flowchart for two channel measurements as a simple diagnostic focusing on an amplitude.

FIG. 15 is a second flowchart for two channel measurements as a simple diagnostic focusing on an amplitude. In FIG. 15, two channel measurements can be applied to a gain diagnosis as well. A null angle always remain stable at 180° as long as phase errors during VGA controls are in-variant and the null-depth can vary according to the VGA codes.

FIG. 15 assumes that phase shifting is complete, and then performs a two channel measurement wherein a relative phase evaluation is modified to perform a "relative amplitude check method." In the relative phase check method, a relative phase is simplified to a 180 degree setting, and only a relative amplitude setting is changed.

Figure 16:
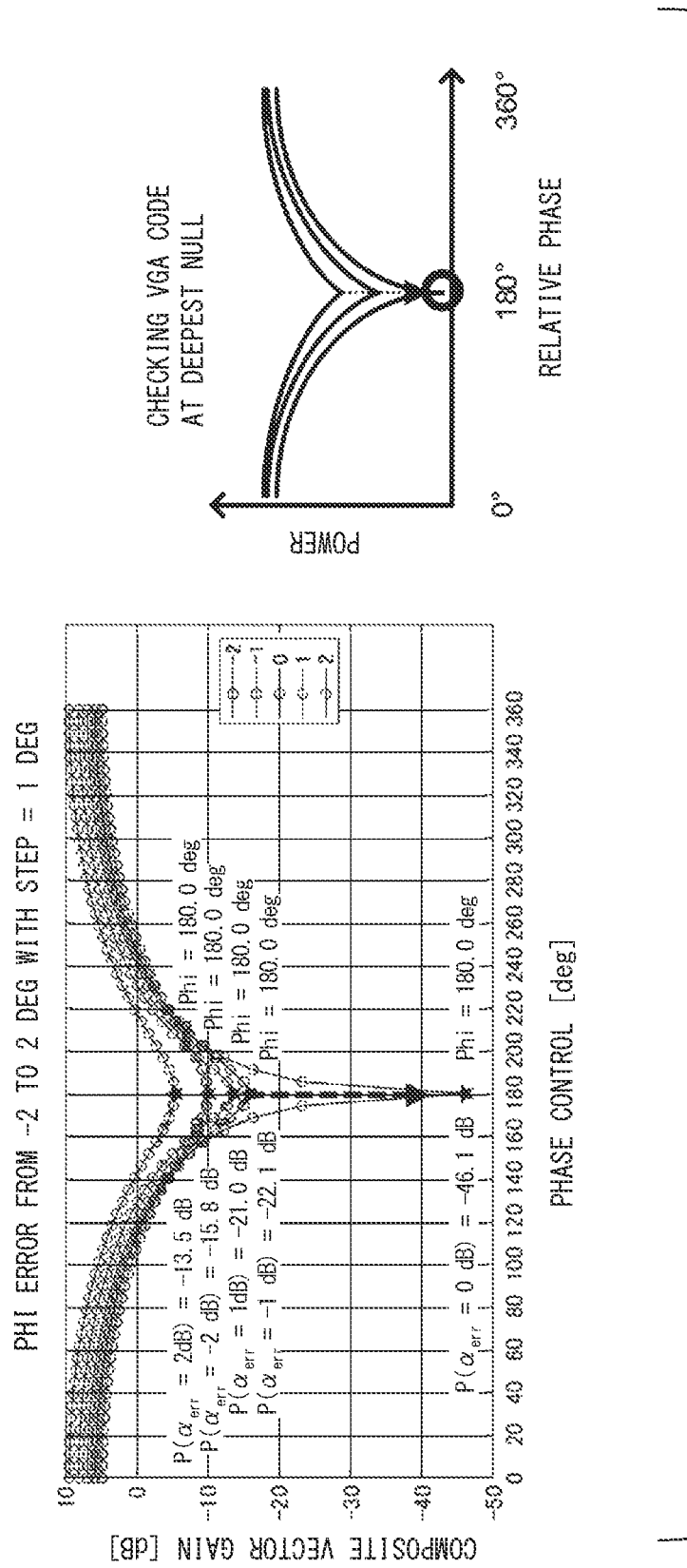
FIG. 16 is a simulation diagram of FIG. 15.

FIG. 16 is a simulation of FIG. 15.

FIG. 16 illustrates a simulation result with amplitude errors ($\alpha_{err}$) to determine an optimized gain setting from a deepest null. A relative amplitude error equal to 0 dB yields a deepest Null, thereby enabling a simplified functionality check about the amplitude control.

Relatedly, in FIG. 9 a null monitor method enables checking not only the relative phase, but also enables checking a relative amplitude.

Figure 17:
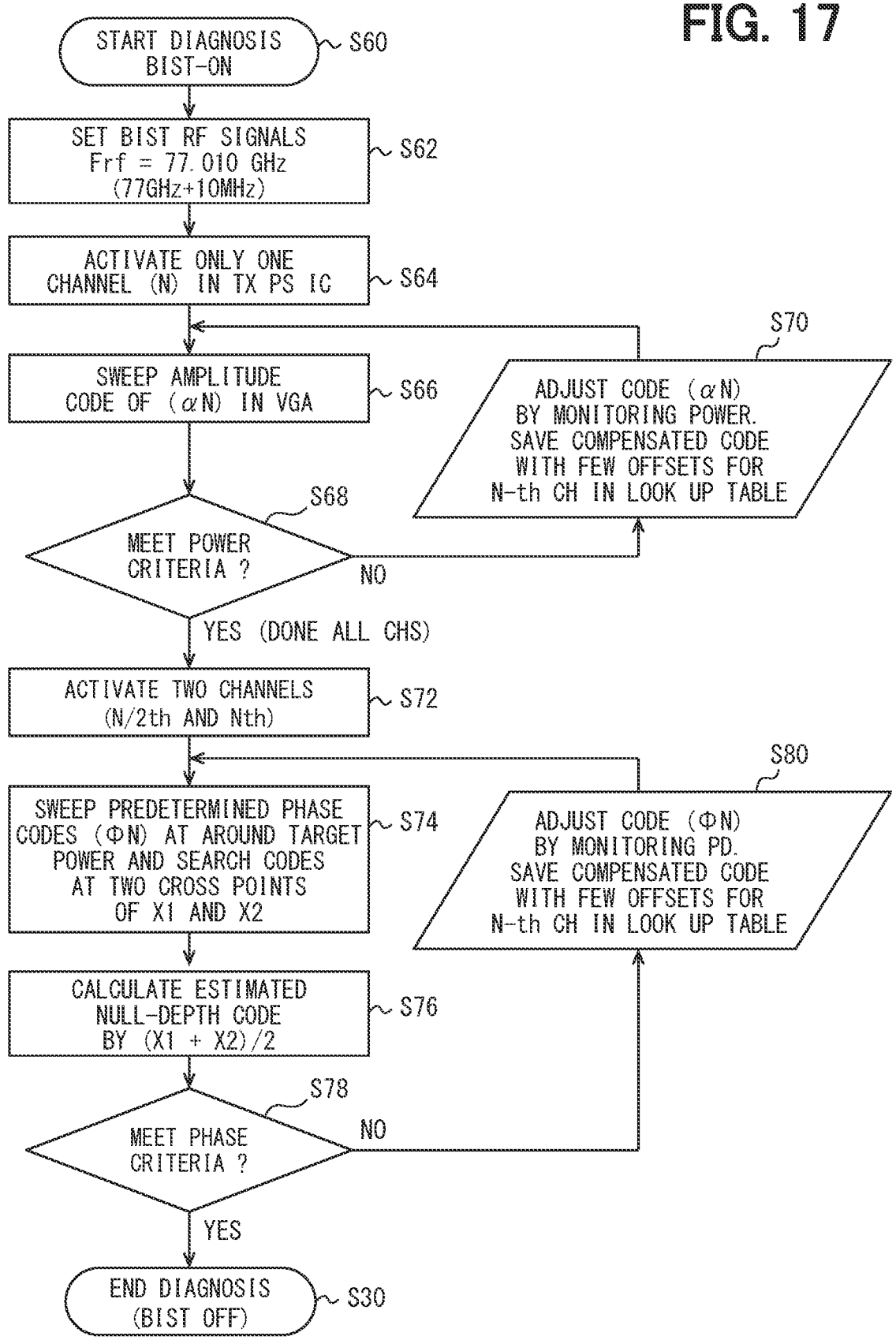
FIG. 17 is a flowchart for two channel measurements as a simple diagnosis focusing on amplitude/phase with an efficient null-depth search method.

FIG. 17 is a third flowchart for two channel measurements as a simple diagnosis focusing on amplitude/phase with an efficient null-depth search method.

In FIG. 17, step S62 may also activate BIST-related signals from synchronized PLL in the transceiver IC. For example, fLO1, 3=77.000 GHz, CLK1=20 MHz (CLK_I=CLK_Q=10 MHz) and fRF=77.010 GHz.

In FIG. 17, step 72, note that "N/2th" means the center of the channel among N-CHs used as a reference.

In FIG. 17, a null-depth method may yield extremely low power, which may make it impossible to detect. Thus, a simple estimation method for quickly estimating phase code at around 180 degrees relative phase difference equivalent to Null is described.

Figure 18:
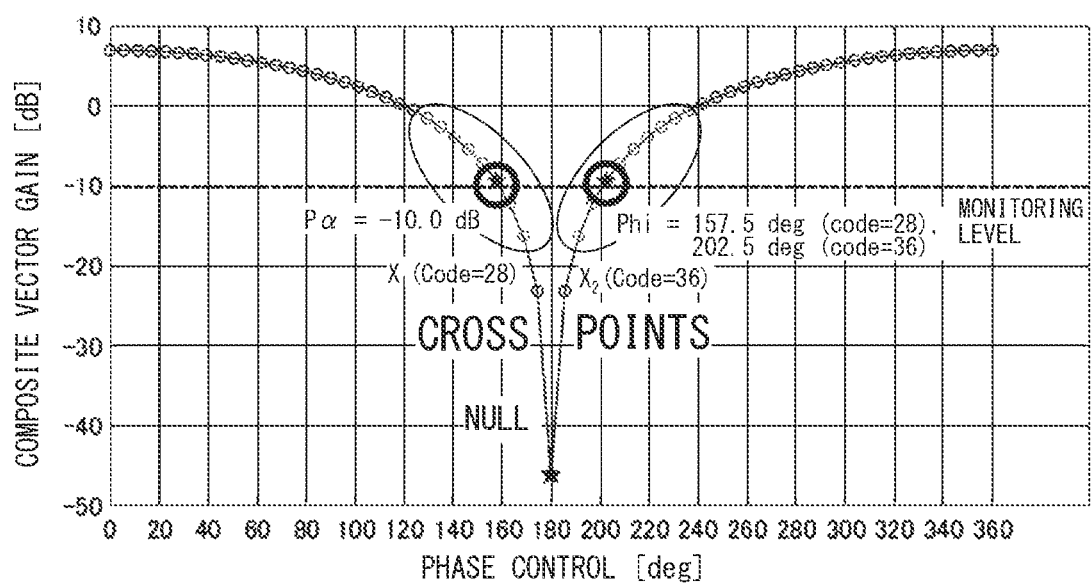
FIG. 18 is a simulation diagram of FIG. 17.

FIG. 18 is a simulation of FIG. 17, which is an example that averages code "28" and "36" at combined output power=−10 dB, for the estimation of code "32" of Null (180 degrees relative phase). If crossing codes at −10 dB are known, only the codes around there are subject to simplified checking. This may be more practical than other flowcharts.

Other Embodiments

The present disclosure is not limited to the embodiments described above, but can be implemented by various modifications, and can be applied to various embodiments without departing from the spirit of the present disclosure.

For example, the following modifications or extensions are possible.

The configurations and functions of the plural embodiments described above may be combined. A part of the above-described embodiment may be dropped as long as the problem identified in the background is resolvable. In addition, various modifications of the present disclosure may be considered as encompassed in the present disclosure, as long as such modifications pertain to the gist of the present disclosure.

Although the present disclosure is described based on the above embodiments, the present disclosure is not limited to the disclosure of the embodiment and the structure. The present disclosure is intended to cover various modification examples and equivalents thereof. In addition, various modes/combinations, one or more elements added/subtracted thereto/therefrom, may also be considered as the present disclosure and understood as the technical thought thereof.

What is claimed is:

1. A self-diagnosis device of a millimeter-wave phased-array antenna module comprising:
   a reception phased array circuit, including reception channels configured to:
      (i) respectively input and process received signals, and
      (ii) generate and output a composite reception signal based on the processed received signals;
   a general-purpose multi-channel Integrated Circuit (IC) configured to generate, using a Phase-Locked Loop (PLL) circuit and a clock signal:
      (i) a first output signal,
      (ii) a second output signal,
      (iii) a third output signal, and
      (iv) a fourth output signal, wherein the first, second, third, and fourth output signals are synchronous, and
      (v) an intermediate frequency signal based at least partly on the composite reception signal and the first output signal; and
   a transmission phased array circuit including:
      (i) transmission channels, and
      (ii) a built-in self-test circuit,
   wherein each transmission channel respectively includes a phase shifter (25) configured to receive and to phase shift the second output signal from the general-purpose multi-channel IC, and
   wherein the built-in self-test circuit is configured to generate a self-diagnosis monitor signal based at least partly on:
      (i) the third output signal, wherein the third output signal is NOT used by the transmission channels,
      (ii) the fourth output signal, wherein the fourth output signal is a self-diagnosis clock signal, and
      (iii) the composite transmission signal.

2. The self-diagnosis device of the phased-array antenna module according to claim 1,
   wherein the built-in self-test circuit includes an IQ orthogonal mixer for up-converting the third output signal based at least partially on the fourth output signal and a down-conversion mixer.

3. The self-diagnosis device of the phased-array antenna module according to claim 2,
   wherein the IQ orthogonal mixer includes a 90 degree phase shifter that changes the phase of the third output signal by 90 degrees.

4. The self-diagnosis device of the phased-array antenna module according to claim 2,
   wherein the built-in self-test circuit includes an IQ signal generator configured to:
      (i) receive the fourth output signal,
      (ii) generate a self-diagnosis I signal by frequency dividing a frequency the fourth output signal, and
      (iii) generate a self-diagnosis Q signal by frequency dividing the frequency the fourth output signal, such that the self-diagnosis Q signal is orthogonal to the self-diagnosis I signal, and
   wherein the IQ orthogonal mixer is configured to receive:
      (i) the third output signal,
      (ii) the self-diagnosis I signal, and
      (iii) the self-diagnosis Q signal.

5. The self-diagnosis device of the phased-array antenna module according to claim 4, wherein the built-in self-test circuit further includes:
   a delayer for improving a balance of at least one of the self-diagnosis I signal, and the self-diagnosis Q signal.

6. The self-diagnosis device of the phased-array antenna module according to claim 1,
   wherein the built-in self-test circuit includes:
      (i) an IQ orthogonal mixer configured to receive the third output signal and the fourth output signal, and
      (ii) a self-diagnosis phase shifter configured to generate a self-diagnosis shifted signal based directly or indirectly upon at least one output from the IQ orthogonal mixer.

7. The self-diagnosis device of the phased-array antenna module according to claim 1 further comprising:
   a signal processor configured to monitor the self-diagnosis monitor signal; and
   a control circuit configured to turn ON two adjacent transmission channels, while simultaneously turning OFF all other transmission channels, wherein
   the signal processor is further configured to change a phase shift of a first phase shifter of a first of the two adjacent channels, such that a combined power changes according to a relative phase difference of the phase shifters of the two adjacent transmission channels based on a result of monitoring the self-diagnosis monitor signal.

8. The self-diagnosis device of the phased-array antenna module according to claim 1 further comprising:
- a plurality of couplers for coupling the outputs of the transmission channels of the plurality of transmission channels, and
- a transmission line for transmitting signals coupled by the plurality of couplers, wherein
- the transmission line transmits signals from the plurality of couplers using an equal-length path that is coupled to each other in a tournament manner.

9. The self-diagnosis device of the phased-array antenna module according to claim 1,
- wherein the transmission phased array circuit includes PAD couplers capacitively coupling the transmission channels to the transmission line.

10. The self-diagnosis device of the phased-array antenna module according to claim 1,
- wherein the transmission phased array circuit includes Printed Circuit Board (PCB) wiring couplers formed in a Printed Circuit Board (PCB) on which the transmission channels are mounted.

11. The self-diagnosis device of the phased-array antenna module according to claim 10,
- wherein each PCB wiring coupler includes a respective coupling portion configured to partially surround a respective through-hole via formed in the PCB, and
- wherein each through-hole via couples a respective channel to a respective antenna.

12. A phased-array antenna module comprising:
- a reception phased array circuit including: a first reception phase shifter circuit, and a second reception phase shifter;
- a multi-channel circuit including: a first multi-channel receiver, a second multi-channel receiver, and a phase-locked loop (PLL) circuit; and
- a transmission phased array circuit including: a first transmission phase shifter circuit, and transmission antennas,
- wherein the reception phased array circuit is configured to output:
  - (i) a first composite reception signal from the first reception phase shifter circuit to the first multi-channel receiver, and
  - (ii) a second composite reception signal from the second reception phase shifter circuit to the second multi-channel receiver;
- wherein the multi-channel circuit is configured to receive:
  - (i) the first composite reception signal,
  - (ii) the second composite reception signal, and
  - (ii) a reference clock signal;
- wherein the multi-channel circuit is configured to output:
  - (i) a first intermediate frequency signal based at least partly upon: the first composite signal, and a first output signal,
  - (ii) a second output signal based at least partly on the reference clock signal,
  - (iii) a third output signal based at least partly on the reference clock signal and generated independently from the second output signal,
  - (iv) a self-diagnosis clock signal based on the reference clock signal, and having a lower frequency than the reference clock signal;
- wherein the first transmission phase shifter circuit is configured to receive:
  - (i) the second output signal,
  - (ii) the third output signal,
  - (iii) the self-diagnosis clock signal, and
  - (iv) the first intermediate frequency signal; and
- wherein the first transmission phase shifter circuit is configured to output:
  - (i) a self-diagnosis monitor signal, and
  - (ii) transmission channel output signals.

13. The phased-array antenna module according to claim 12,
- wherein the first reception phase shifter circuit includes:
  - (i) a first reception channel configured to receive from a first reception antenna, and to send to an output terminal,
  - (ii) a second reception channel configured to receive from a second reception antenna, and to send to the output terminal, and
  - (iii) a third reception channel configured to receive from a third reception antenna, and to send to the output terminal;
  - (iv) a power detector;
  - (v) an output terminal, and
- wherein the first reception channel includes, in series:
  - (i) a low noise amplifier (LNA),
  - (ii) a first variable gain amplifier,
  - (iii) a phase shifter, and
  - (iv) a fourth variable gain amplifier.

14. The phased-array antenna module according to claim 12,
- wherein the phase-locked loop circuit in the multichannel circuit is configured to:
  - (i) receive the reference clock signal;
  - (ii) output a first raw signal to the first multi-channel receiver;
  - (iii) output a second raw signal to a first series, the first series including: a first multiplier, a first phase shifter, and a first power amplifier, such that the first power amplifier outputs the second output signal;
  - (iv) output a third raw signal to a second series, the second series including: a second multiplier, a second phase shifter, and a second power amplifier, such that the second power amplifier outputs the third output signal; and
  - (v) output the self-diagnosis clock signal.

15. The phased-array antenna module according to claim 12,
- wherein the first transmission phase shifter circuit includes a built-in self-test circuit including:
  - (i) an IQ orthogonal mixer;
  - (ii) an IQ signal generator;
  - (iii) an adder circuit;
  - (iv) a mixer; and
  - (v) an analog/digital converter,
- wherein the self-diagnosis signal generation circuit is configured to:
  - (i) receive the third output signal,
  - (ii) receive the self-diagnosis clock signal,
  - (iii) receive a composite transmission signal from a transmission line, and
  - (iv) output a self-diagnosis monitor signal,
- wherein the IQ signal generator is configured to: receive the self-diagnosis clock signal, output a I-type clock signal, and output a Q-type clock signal;
- wherein the IQ orthogonal mixer is configured to: receive the third output signal, to receive the I-type clock signal, receive the Q-type clock signal, to output a first frequency converted signal, and output a second frequency converted signal;

wherein the adder circuit is configured to: receive the first frequency converted signal, receive the second frequency converted signal, and output a synthesized signal;

wherein the mixer is configured to: receive the added signal of IQ orthogonal mixers receive the composite transmission signal, and output a mixed signal; and wherein the analog/digital converter is configured to: receive the mixed signal, and output a digital signal.

16. The phased-array antenna module according to claim 12, wherein the IQ orthogonal mixer includes:
(i) a 90 degree phase shifter,
(ii) a first frequency converter, and
(iii) a second frequency converter;

wherein the 90 degree phase shifter is configured to: receive an unshifted signal, and output a shifted output signal;

wherein the first frequency converter is configured to: receive the unshifted signal, receive the I-type clock signal, and output the first frequency converted signal;

wherein the second frequency converter is configured to receive the shifted output signal, receive the Q-type clock signal, and output the second frequency converted signal.

17. The phased-array antenna module according to claim 12, wherein the IQ orthogonal mixer includes:
(i) a hybrid coupler,
(ii) a first frequency converter, and
(iii) a second frequency converter;

wherein the a hybrid coupler is configured to: receive the third output signal, output a first coupled signal, and output a second coupled signal;

wherein the first frequency converter is configured to: receive the first coupled signal, receive the I-type clock signal, and output the first frequency converted signal;

wherein the second frequency converter is configured to receive the second coupled signal, receive the Q-type clock signal, and output the second frequency converted signal.

* * * * *